United States Patent
Elwailly et al.

(10) Patent No.: US 10,284,308 B1
(45) Date of Patent: May 7, 2019

(54) SATELLITE SYSTEM CALIBRATION IN ACTIVE OPERATIONAL CHANNELS

(71) Applicant: Space Systems/Loral, LLC, Palo Alto, CA (US)

(72) Inventors: Farid Elwailly, San Jose, CA (US); David Grybos, San Jose, CA (US); James Knecht, San Jose, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 56 days.

(21) Appl. No.: 15/926,628

(22) Filed: Mar. 20, 2018

Related U.S. Application Data

(63) Continuation-in-part of application No. 15/833,351, filed on Dec. 6, 2017.

(51) Int. Cl.
  *H04B 17/11* (2015.01)
  *H04B 17/21* (2015.01)
  (Continued)

(52) U.S. Cl.
  CPC ............ *H04B 17/21* (2015.01); *H04B 7/0617* (2013.01); *H04B 7/155* (2013.01); *H04B 7/185* (2013.01); *H04B 17/11* (2015.01)

(58) Field of Classification Search
  CPC ........ H04B 17/11; H04B 17/12; H04B 17/21; H04B 7/155; H04B 7/185; H04B 7/18515; H04B 1/0046; H04B 1/18; H04B 1/40
  (Continued)

(56) References Cited

U.S. PATENT DOCUMENTS

| 4,907,004 A | 3/1990 | Zacharatos et al. |
| 5,530,449 A | 6/1996 | Wachs et al. |

(Continued)

FOREIGN PATENT DOCUMENTS

| CN | 102394679 B | 7/2014 |
| EP | 0812027 B1 | 5/2005 |
| EP | 1532716 B1 | 5/2005 |

OTHER PUBLICATIONS

U.S. Appl. No. 15/833,351, filed Dec. 6, 2017.
(Continued)

*Primary Examiner* — Shaima Q Aminzay
(74) *Attorney, Agent, or Firm* — Vierra Magen Marcus LLP

(57) ABSTRACT

Disclosed herein is a system including analog receive paths and analog transmit paths and signal processing equipment onboard a satellite, and methods for use therewith. For each of a plurality of the analog receive paths, a calibration signal is injected therein below a noise floor thereof, while the path is actively used to receive and condition an RF signal, and the calibration signal is extracted from the analog receive path after the signal has traveled through at least a portion of the path. The extracted calibration signal is compared to the injected calibration signal to determine gain and phase deviations caused by the path. Gain and phase characteristics of the analog receive paths are adjusted to compensate for different gain and phase deviations being caused by different paths. Similar techniques are used to compensate for different gain and phase deviations being caused by different analog transmit paths.

29 Claims, 9 Drawing Sheets

(51) Int. Cl.
*H04B 7/155* (2006.01)
*H04B 7/06* (2006.01)
*H04B 7/185* (2006.01)

(58) Field of Classification Search
USPC .......................................................... 455/9
See application file for complete search history.

(56) References Cited

U.S. PATENT DOCUMENTS

| | | |
|---|---|---|
| 5,543,801 A | 8/1996 | Shawyer |
| 5,886,573 A | 3/1999 | Kolanek |
| 6,668,161 B2 | 12/2003 | Boros et al. |
| 7,688,692 B2 | 3/2010 | Chen |
| 7,787,819 B2 | 8/2010 | Walker et al. |
| 7,822,147 B2 | 10/2010 | Huang et al. |
| 8,184,678 B2 | 5/2012 | McHenry |
| 8,618,878 B2 | 12/2013 | Hangai et al. |
| 9,014,619 B2 | 4/2015 | Benjamin et al. |
| 9,608,716 B1 | 3/2017 | Elwailly et al. |
| 9,735,742 B2 | 8/2017 | Roukos et al. |
| 2004/0046695 A1 | 3/2004 | Brothers, Jr. et al. |
| 2004/0061644 A1 | 4/2004 | Lier et al. |
| 2005/0272392 A1 | 12/2005 | Richardson |
| 2008/0051080 A1 | 2/2008 | Walker et al. |
| 2008/0153433 A1 | 6/2008 | Pallonen et al. |
| 2009/0153394 A1 | 6/2009 | Navarro et al. |
| 2009/0298422 A1 | 12/2009 | Conroy et al. |
| 2010/0090762 A1 | 4/2010 | van Zelm et al. |
| 2010/0156528 A1 | 6/2010 | Couchman et al. |
| 2010/0164782 A1* | 7/2010 | Saha ............... H04B 7/18515 342/174 |
| 2010/0177678 A1 | 7/2010 | Sayegh |
| 2011/0267141 A1 | 11/2011 | Hangai et al. |
| 2014/0354355 A1 | 12/2014 | Moreau |
| 2014/0362896 A1 | 12/2014 | Aymes et al. |
| 2016/0087713 A1 | 3/2016 | Oderman et al. |
| 2017/0093539 A1 | 3/2017 | Wang |
| 2018/0019806 A1 | 1/2018 | Buer et al. |
| 2018/0227043 A1 | 8/2018 | Dankberg |
| 2019/0007129 A1 | 1/2019 | Vargas et al. |

OTHER PUBLICATIONS

U.S. Appl. No. 15/926,186, filed Mar. 20, 2018.
Notice of Allowance dated Jan. 28, 2019, U.S. Appl. No. 15/926,186, filed Mar. 20, 2018.
Notice of Allowance dated Mar. 12, 2019, U.S. Appl. No. 15/833,351, filed Dec. 6, 2017.

* cited by examiner

US 10,284,308 B1

SATELLITE SYSTEM CALIBRATION IN ACTIVE OPERATIONAL CHANNELS

PRIORITY CLAIM

This application is a continuation-in-part (CIP) of and claims priority to commonly invented and commonly assigned U.S. patent application Ser. No. 15/833,351, filed Dec. 6, 2017, and titled CALIBRATION OF SATELLITE BEAMFORMING CHANNELS, which is incorporated herein by reference.

BACKGROUND

Spacecraft for communications and broadcast services can operate in geosynchronous orbit. Such spacecraft can communicate with a subscriber terminal (ST) by generating a forward user downlink signal, also known as a service downlink beam, for reception by the ST associated with a user. In return, the ST can transmit back a return user uplink signal, also known as a service uplink beam, via the ST to the spacecraft. The positioning or pointing, of the forward user downlink signal towards the ST can drift over time, for example, due to temperature changes on the spacecraft, drifts in orbit, degradation of active components, etc.

Spacecraft that include a phase array antenna can use beamforming for transmitting the forward user downlink signal to an ST, and for receiving a return user uplink signal from an ST. Beamforming is a technique in which the phased array antenna is used to position the forward user downlink signal such that it is optimized in data capacity at a specific location of the user, and more specifically, the ST. Beamforming coefficients can be used to adjust the forward user downlink signal's gain and phase (e.g., by adjusting the gain of the signal provided by an amplifier) at the phased array transmitter to change the pointing of the signal. Exemplary beamforming coefficients include gain and phase coefficients, but are not limited thereto. Signal processing circuitry (e.g., including one or more beamformers and one or more digital channelizers, but not limited thereto) onboard the spacecraft can use the beamforming coefficients to "beamform" the forward user downlink signal by adjusting its gain and phase. However certain components of the spacecraft may need to be calibrated as the spacecraft drifts. Otherwise, beamformed signals may become degraded. Calibration of certain components of the spacecraft may also be needed even where beamforming is not performed onboard the spacecraft.

DETAILED DESCRIPTION

Figure 1:
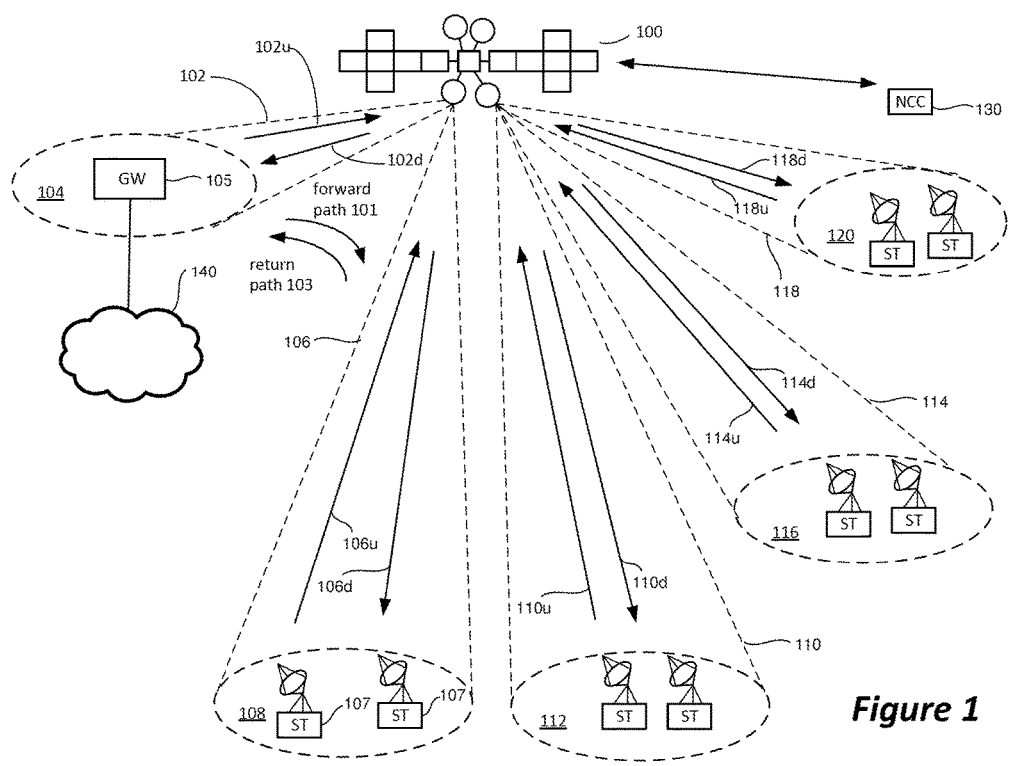
FIG. 1 is a block diagram describing a wireless communication system, which may be a satellite communication system.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout. In addition, the first digit of a reference number identifies the drawing in which the reference number first appears.

Certain embodiments of the present technology described herein relate to a system including analog receive paths and analog transmit paths and signal processing equipment (which may or may not include one or more beamformers) onboard a satellite, and methods for use therewith. For each analog receive path of a plurality of the analog receive paths, a calibration signal is injected into the analog receive path below a noise floor thereof, while the analog receive path is actively used to receive and condition an RF signal. The calibration signal is extracted from the analog receive path after the signal has traveled through at least a portion of the path. The extracted calibration signal is compared to the injected calibration signal to determine gain and phase deviations caused by the path. Gain and phase characteristics of the analog receive paths are adjusted to compensate for different gain and phase deviations being caused by different paths. In this manner, one or more components of the analog receive paths can be calibrated as the satellite drifts. Similar techniques can be used to compensate for different gain and phase deviations being caused by different analog transmit paths. Prior to describing further details of specific embodiments of the present technology, it is first useful to describe an exemplary wireless communication system with which embodiments of the present technology would be useful. An example of such a wireless communication system will now be described with reference to FIG. 1.

FIG. 1 depicts a block diagram of a wireless communications system that includes a communication platform 100, which may be a satellite located, for example, at a geostationary or non-geostationary orbital location. In other embodiments, other platforms may be used such as an unmanned aerial vehicle (UAV) or balloon, or even a ship for submerged subscribers. In yet another embodiment, the subscribers may be air vehicles and the platform may be a ship or a truck where the "uplink" and "downlink" in the following paragraphs are reversed in geometric relations. Platform 100 may be communicatively coupled to at least one gateway (GW) 105 and a plurality of subscriber terminals ST (including subscriber terminals 107). The term subscriber terminals may be used to refer to a single subscriber terminal or multiple subscriber terminals. A subscriber terminal ST is adapted for communication with the wireless communication platform 100, which as noted above, may be a satellite. Subscriber terminals may include fixed and mobile subscriber terminals including, but not limited to, a cellular telephone, a wireless handset, a wireless modem, a data transceiver, a paging or position determination receiver, or mobile radio-telephone, or a headend of an isolated local network. A subscriber terminal may be handheld, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, or a mobile. Where the communication platform of a wireless communication system is a satellite, the wireless communication system can be referred to more specifically as a satellite communication system. For the remainder of this description, unless stated otherwise, it is assumed that the communication platform 100 is a satellite. Accordingly, platform 100 will often be referred to as satellite 100, and the wireless communication system will often be referred to as a satellite communication system.

In one embodiment, satellite 100 comprises a bus (e.g., spacecraft) and one or more payloads (e.g., the communication payload). The satellite will also include multiple power sources, such as batteries, solar panels, and one or more propulsion systems, for operating the bus and the payload.

The at least one gateway 105 may be coupled to a network 140 such as, for example, the Internet, terrestrial public switched telephone network, mobile telephone network, or a private server network, etc. Gateway 105 and the satellite (or platform) 100 communicate over a feeder beam 102, which can have a feeder uplink 102u and/or a feeder downlink 102d. In certain embodiments, a feeder downlink beam 102d is a spot beam to illuminate a region 104 on the Earth's surface (or another surface). Gateway 105 is located in region 104 and communicates with satellite 100 via feeder beam 102. Although a single gateway is shown, some implementations will include many gateways, such as five, ten, or more. One embodiment includes only one gateway. Each gateway may utilize its own feeder beam, although more than one gateway can be positioned within a feeder beam. In one embodiment, a gateway is located in the same spot beam as one or more subscriber terminals.

Subscriber terminals ST and satellite 100 communicate over service beams, which are also known as user beams. For example, FIG. 1 shows service beams 106, 110, 114 and 118 for illuminating regions 108, 112, 116 and 120, respectively. In many embodiments, the communication system will include more than four service beams (e.g., sixty, one hundred, etc.). Each of the service beams can have an uplink (106u, 110u, 114u, 118u) and/or a downlink (106d, 110d, 114d, 118d) for communication between subscriber terminals ST and satellite 100. Although FIG. 1 only shows two subscriber terminals within each region 108, 112, 116 and 120, a typical system may have thousands of subscriber terminals within each region.

In one embodiment, communication within the system of FIG. 1 follows a nominal roundtrip direction whereby data is received by gateway 105 from network 140 (e.g., the Internet) and transmitted over the forward path 101 to a set of subscriber terminals ST. In one example, communication over the forward path 101 comprises transmitting the data from gateway 105 to satellite 100 via uplink 102u of feeder beam 102, through a first signal path on satellite 100, and from satellite 100 to one or more subscriber terminals ST via downlink 106d of service beam 106. An uplink (e.g., 102u) of a feeder beam (e.g., 102) can also be referred to more succinctly as a feeder uplink beam, and the downlink (e.g., 106d) of a service beam (e.g., a 106) can also be referred to more succinctly as a service downlink beam. Although the above example mentions service beam 106, the example could have used other service beams.

Data can also be sent from the subscriber terminals STs over the return path 103 to gateway 105. In one example, communication over the return path comprises transmitting the data from a subscriber terminal (e.g., subscriber terminal 107 in service beam 106) to satellite 100 via uplink 106u of service beam 106, through a second signal path on satellite 100, and from satellite 100 to gateway 105 via downlink 102d of feeder beam 102. An uplink (e.g., 106u) of a service beam (e.g., 106) can also be referred to more succinctly as a service uplink beam, and the downlink 102d of feeder beam 102 can also be referred to more succinctly as a feeder downlink beam. Although the above example uses service beam 106, the example could have used any service beam.

FIG. 1 also shows a Network Control Center (NCC) 130, which can include an antenna and modem for communicating with satellite 100, as well as one or more processors and data storage units. Network Control Center 130 provides commands to control and operate satellite 100. Network Control Center 130 may also provide commands to any of the gateways and/or subscriber terminals.

In one embodiment, communication platform 100 implements the technology described below. In other embodiments, the technology described below is implemented on a different platform (or different type of satellite) in a different communication system. For examples, the communication platform can alternatively be a UAV or balloon, but is not limited thereto.

The architecture of FIG. 1 is provided by way of example and not limitation. Embodiments of the disclosed technology may be practiced using numerous alternative implementations.

Figure 2A:
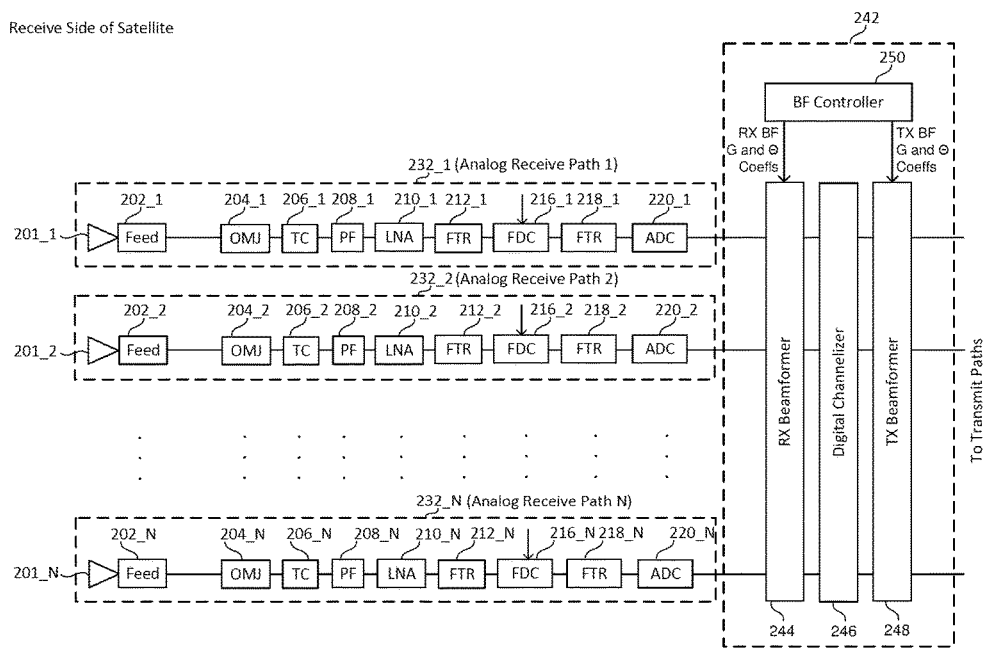
FIG. 2A shows a receive side of an exemplary satellite.
Figure 2B:
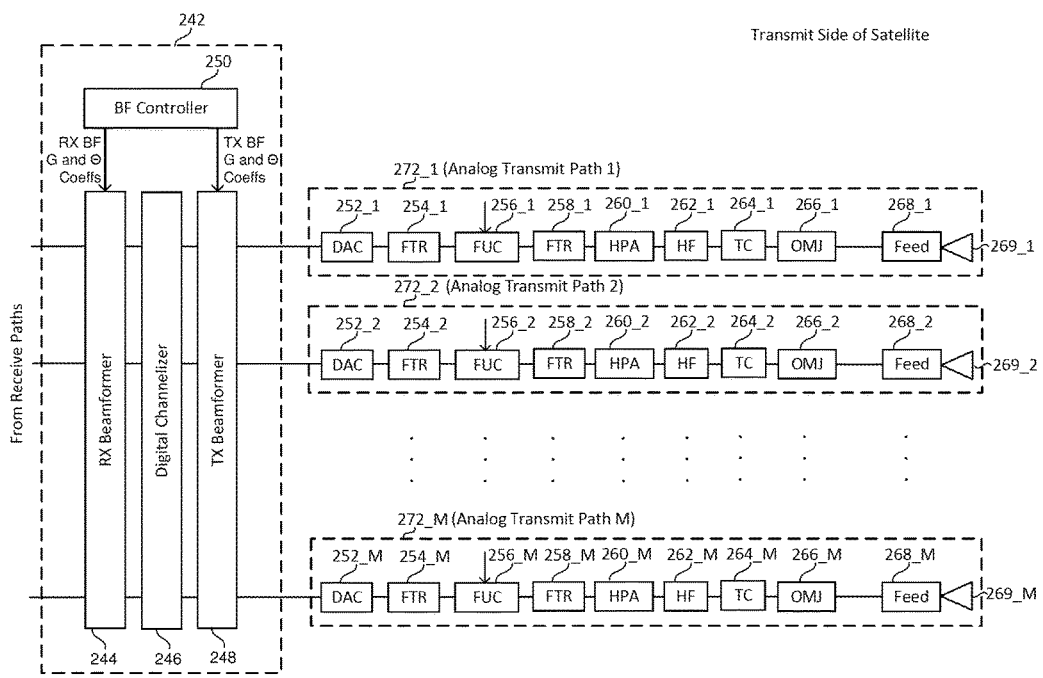
FIG. 2B shows a transmit side of an exemplary satellite.

FIGS. 2A and 2B depict a block diagram of the satellite 100 introduced in FIG. 1. More specifically, FIG. 2A shows a receive side of the satellite 100 and signal processing equipment 242 onboard the satellite 100, and FIG. 2B shows the same signal processing equipment 242 (shown in FIG. 2A) onboard the satellite 100 and a transmit side of the satellite 100. Where the signal processing performed by the signal processing equipment 242 is implemented in the digital domain, the signal processing equipment 242 can be referred to more specifically as digital signal processing equipment 242, or more succinctly as digital processing equipment 242. Exemplary signal processing that can be performed by the signal processing equipment includes beamforming, but is not limited thereto. In accordance with certain embodiments, the signal processing equipment 242 can additionally, or alternatively, include a multiport amplifier (not shown) that may include, e.g., a plurality of amplification units coupled between an input hybrid matrix and an output hybrid matrix, and an equalization unit coupled between the virtual input network and the amplification units.

Referring to FIG. 2A, the receive side of the satellite 100 is shown as including a plurality of analog receive paths 232_1, 232_2 ... 232_N, which can be referred to collectively as the analog receive paths 232, or can be referred to individually as an analog receive path 232. The analog receive paths 232 are shown as being coupled to the signal processing equipment 242. As shown in FIG. 2B, the same signal processing equipment 242 is also coupled to a plurality of analog transmit paths 272_1, 272_2 ... 272_N, which can be referred to collectively as the analog transmit paths 272, or can be referred to individually as an analog transmit path 272.

Referring again to FIG. 2A, the analog receive path 232_1 includes a feed element 202_1, an orthomode junction (OMJ) 204_1, a test coupler (TC) 206_1, a pre-select filter (PF) 208_1, a low noise amplifier (LNA) 210_1, a filter (FTR) 212_1, a frequency down converter (FDC) 216_1, a filter (FTR) 218_1, and an analog-to-digital converter (ADC) 220_1. The analog receive path 232_2 similarly includes a feed element 202_2, an OMJ 204_2, a TC 206_2, a PF 208_2, an LNA 210_2, a FTR 212_2, a FDC 216_2, a FTR 218_2, and an ADC 220_2. Similarly, the analog receive path 232_N includes a feed element 202_N, an OMJ 204_N, a TC 206_N, a PF 208_N, an LNA 210_N, a FTR 212_N, a FDC 216_N, a FTR 218_N, and an ADC 220_N. It would also be possible for each of the analog receive paths 232 to include less, more, and/or alternative components that shown in FIG. 2A. For example, in certain embodiments, the FDCs 216 and/or one or more of the filters, can be eliminated.

The feed elements 202_1 to 202_N can be referred to individually as a feed element 202, or collectively as the feed elements 202. The OMJs 204_1 to 204_N can be referred to individually as an OMJ 204, or collectively as the OMJs 204. The TCs 206_1 to 206_N can be referred to individually as a TC 206, or collectively as the TCs 206. The PFs 208_1 to 208_N can be referred to individually as a PF 208, or collectively as the PFs 208. The LNAs 210_1 to 210_N can be referred to individually as an LNA 210, or collectively as the LNAs 210. The FTRs 212_1 to 212_N can be referred to individually as a filter 212, or collectively as the filters 212. The FDCs 216_1 to 216_N can be referred to individually as a frequency down-converter 416, or collectively as the frequency down-converters 416. The FTRs 218_1 to 218_N can be referred to individually as a filter 218, or collectively as the filters 218. The ADCs 220_1 to 220_N can be referred to individually as an ADC 220, or collectively as the ADCs 220. While not specifically shown in FIG. 2A, the satellite can also include one or more local oscillators (LOs) that provide RF signals to the FDCs 216.

The feed element 202_1 is coupled to a respective antenna element 201_1, the feed element 202_2 is coupled to a respective antenna element 201_2, ... and the feed element 202_N is coupled to a respective antenna element 201_N. The feed elements 202_1 to 202_N form a multiple element antenna feed array. The antenna elements 201_1 to 201_N form a multiple antenna element array. The antenna elements 201_1 to 201_N can be referred to collectively the antenna elements 201, or individually as an antenna 201. Each feed element 202 gathers and focuses radio waves of a service uplink beam (e.g., 106u) and converts them to an RF signal that is provided to a respective OMJ 204. A feed element 202 and the rest of an antenna can be collectively referred to as the antenna or antenna system. In other words, an antenna, as the term is used herein, can include a feed element. All or some of the feed elements 202 can share a common reflector. Such reflector(s) is/are not shown in the Figures, to simply the Figures. Each OMJ 204 either passes through a right hand circular polarization (RHCP) or a left hand circular polarization (LHCP) RF signal. Each OMJ 204 can alternatively pass through either a horizontal or a vertical linear polarization RF signal. Each test coupler TC 206 can be used for power monitoring, payload testing and/or performing calibrations based on signals passing therethrough. Each pre-select filter (PF) 208 (e.g., a band-pass filter) is used to remove unwanted frequency components and/or enhance desired frequency components. For an example, each PF 208 can pass frequencies within the range of 29.5-30.0 GHz, but is not limited thereto. Each LNA 210 amplifies the relatively low-power RF signal it receives from a respective PF 208 without significantly degrading the signal's signal-to-noise ratio (SNR). The amplified RF signal that is output by each LNA 210 is provided to a respective filter 212.

Each filter 212 allows frequencies to pass within a specified frequency range (e.g., 29.50-30.00 GHz), and the filters 218 that are downstream of the frequency down-converters 216 are used to filter out unwanted frequency components (e.g., unwanted mixed products) that result from the frequency down-conversions.

Each frequency down-converter (FDC) 216 receives an RF signal from a filter 212 (which RF signal includes data from an uplink beam, and thus, can be referred to as an RF data signal) and an RF signal from an local oscillator (not shown), which RF signal can be referred to as an LO signal. Each FDC 216 uses the LO signal to down-convert the RF data signal to a frequency range at which beamforming and other signal processing (e.g., digital signal processing) is performed by the signal processing equipment 242 onboard the satellite. The output of each frequency down-converter 216 is provided to a filter 218. For example, the frequency down-converter 216_1 provides its output to the filter 218_1, and the frequency down-converter 216_2 provides its output to the filter 218_2. Each filter 218 can be a bandpass filter that allows frequencies to pass within a specified frequency range. The analog signal output by each filter 218 is shown as being provided to a respective ADC 220, which converts that analog signal to a digital signal that is provided to the signal processing equipment 242. Each of the analog receive paths 232 can include more or less components than shown, and/or may include alternative components, depending upon implementation. Accordingly, embodiments of the present technology is not limited to use with the specific analog receive paths 232 shown.

In FIGS. 2A and 2B, the signal processing equipment 242 is shown as including a receive (RX) beamformer 244, a digital channelizer 246, a transmit (TX) beamformer 248, and a beamformer (BF) controller 250. The BF controller 250 can be configured to produce gain (G) and phase (θ) beamforming coefficients in dependence on calibration information accepted from a calibration subsystem, and can provide such beamforming coefficients to the RX beamformer 244 and the TX beamformer 248. Gain beamforming coefficients are also sometimes referred to as amplitude beamforming coefficients. Separate gain and phase beamforming coefficients can be provided by the BF controller 250 to the RX beamformer 244 than is provided to the TX beamformer 248. Beneficially, with beamforming, spot beams can be added, removed or reconfigured to enable a satellite to operate from different orbital locations and to adapt to changes in traffic patterns or to new applications.

Referring to FIG. 2A, the analog receive paths 232_1 to 232_N collectively provide N signals to the RX beamformer 244. In FIG. 2A the ADCs 220 are shown as being elements of the analog receive paths 232, but can instead be considered elements of the RX beamformer 244, or more generally can be considered elements of the signal processing circuitry 242. Either way, the RX beamformer 244 accepts N digital signals, each of which corresponds to a separate one of the analog receive paths 232. The N digital signals accepted by the RX beamformer 244 can be duplicated and combined on various different manners by the RX beamformer 244 to produce beamformed signals that are provided to the digital channelizer 246. The number of beamformed signals that the RX beamformer 244 produces and provides to the digital channelizer 246 can differ (and will likely be greater) than the number of analog receive paths 232.

The digital channelizer 246 can include, for example, demultiplexer circuitry, filter and switch circuitry, multiplexer circuitry, and a digital channel process (DCP) controller, but is not limited thereto. The DCP controller can control the various circuitry of the digital channelizer 246. For example, the DCP controller can store or otherwise access one or more routing table(s) that are used to control the switching that is performed by the filter and switch circuitry and/or operation of the demultiplexer and multiplexer circuitry, to achieve flexible routing and a high spectral efficiency by changing the frequency and beam allocation in a flexible manner by means of digital signal processing. The demultiplexer circuitry can decompose or separate digitized RF signals into independently routable sub-channels or sub-bands. The filter and switch circuitry can route the decomposed sub-channels to beams and frequencies as desired. At the multiplexer circuitry, the sub-channels that were rearranged by the filter and switch circuitry can be multiplexed or combined as desired, and then provided to the output ports of the digital channelizer 246. Explained another way, the demultiplexer, the filter and switch, and the multiplexer circuitry of the digital channelizer 246, under the control of the DCP controller, can digitally divide each sub-band of the digitized RF signals into frequency slices that can be separated, filtered, switched, processed, routed and/or recombined into digital RF output signals (in output sub-bands) and output from the digital channelizer 246. The filter and switch circuitry of the digital channelizer 246 can include, e.g., a crossbar switch, a multiple stage switch network, or another switch structure for routing frequency slices as desired. In FIGS. 2A and 2B, the same digital channelizer 246 is shown as being used to handle forward link signals and return link signals. It would also be possible for a satellite to include a forward link channelizer and a return link channelizer that are separate from one another, and which may or may not share some of the same circuitry, depending upon implementation.

The digital channelizer 246 provides digital RF signals to the TX beamformer 248. The TX beamformer 248 accepts digital RF signals from the digital channelizer 246, and produces M beamformed signals, each of which is provided to a separate one of the M analog transmit paths 272 shown in FIG. 2B. The digital RF signals accepted by the TX beamformer 248 (from the digital channelizer 246) can be duplicated and combined in various different manners by the TX beamformer 248 to produce the M beamformed signals that are provided to the M analog transmit paths 272.

While the RX beamformer 244, the digital channelizer 246, and the TX beamformer 248 are shown as separate blocks in FIGS. 2A and 2B, as well as other figures, that need not be the case. In other words, the functionality of the RX beamformer 244, the digital channelizer 246, and the TX beamformer 248 can be combined and/or separated in various different manners while still being within the scope of the embodiments described herein. Further, it is possible that one digital channelizer handles forward link traffic, while a separate digital channelizer handles reverse link traffic. Other variations are also possible. For example, as noted above, it is possible that the signal processing equipment 242 not include beamforming equipment. Further, as noted above, it is possible that the signal processing equipment includes one or more multiport amplifiers.

Referring to FIG. 2B, the transmit side of the satellite is shown as including M separate analog transmit paths 272_1 to 272_M. The total number (M) of the analog transmit paths 272 can be the same or different than the total number (N) of the analog receive paths 232, depending upon implementation. In other words, N and M can be integers that may be equal or may differ from one another, depending upon implementation. The analog transmit path 272_1 is shown as including a digital-to-analog converter (DAC) 252_1, a filter (FTR) 254_1, a frequency-up-converter (FUC) 256_1, a filter (FTR) 258_1, a high power amplifier (HPA) 260_1, a harmonic filter (HF) 262_1, a test coupler (TC) 264_1, an orthomode junction (OMJ) 266_1, and a feed element 268_1. The analog transmit path 272_2 is similarly shown as including a DAC 252_2, a FTR 254_2, a FUC 256_2, a FTR 258_2, a HPA 260_2, a HF 262_2, a TC 264_2, a OMJ 266_2, and a feed element 268_2. Similarly, the analog transmit path 272_M is shown as including a DAC 252_M, a FTR 254_M, a FUC 256_M, a FTR 258_M, a HPA 260_M, a HF 262_M, a TC 264_M, a OMJ 266_M, and a feed element 268_M.

The DACs 252_1 to 252_M can be referred to collectively as the DACs 252, or individually as a DAC 252. The filters 254_1 to 254_M can be referred to collectively as the filters 254, or individually as a filter 254. The frequency-up-converters 256_1 to 256_M can be referred to individually as the frequency-up-converters 256, or individually as a frequency-up-converter 256. The filters 258_1 to 258_M can be referred to collectively as the filters 258, or individually as a filter 258. The HPAs 260_1 to 260_M can be referred to collectively as the HPAs 260, or individually as an HPA 260. The HFs 262_1 to 262_M can be referred to collectively as the HFs 262, or individually as an HF 262. The TCs 264_1 to 264_M can be referred to collectively as the TCs 264, or individually as a TC 264. The OMJs 266_1 to 266_M can be referred to collectively as the OMJs 266, or individually as an OMJ 266. The feed elements 268_1 to 268_M can be referred to collectively as the feed element 268, or individually as a feed element 268.

Each DAC 252 converts a digital beamformed signal received from the TX beamfomer 248 to an analog RF signal, which is then filtered by a filter 254 before the analog RF signal is provided to a frequency-up-converter 256. Each filter 254 allows frequencies to pass within a specified frequency range, and the filters 258 that are downstream of the frequency-up-converters 256 are used to filter out unwanted frequency components (e.g., unwanted mixed products) that result from the frequency-up-conversions. Each frequency-up-converter (FUC) 256 receives an RF signal from a filter 254 and an RF signal from an local oscillator (not shown), which RF signal can be referred to as an LO signal. Each frequency-up-converter 256 uses the LO signal to up-convert the RF signal to a frequency range at which RF signals are transmitted from the satellite to a subscriber terminal ST. It would also be possible for each of the analog transmit paths 272 to include less, more, and/or alternative components that shown in FIG. 2B. For example, in certain embodiments, the FUCs 256 and/or one or more of the filters, can be eliminated.

Each HPA 260 amplifies the RF signal it receives so that the RF signal has sufficient power to enable transmission thereof from the satellite 100 in space to a service terminal ST, which may be on the ground. Each HPA 260 can be, e.g., a linearized traveling wave tube high power amplifier, but is not limited thereto. The signal that is output by each of the HPAs 260 can be referred to as an amplified RF signal. Each HF 262 is used to reduce out-of-band emissions caused by the nonlinearity caused by a respective HPA 260. Each HF 262 can be, e.g., a waveguide cavity filter, but is not limited thereto. Each test coupler TC 264 can be used for power monitoring, payload testing and/or performing calibrations based on signals passing therethrough. Each OMJ 266 adds either right hand circular polarization (RHCP) or left hand circular polarization (LHCP) to the RF signal that is passed through the OMJ. This allows for color reuse frequency band allocation, wherein each color represents a unique combination of a frequency band and an antenna polarization. This way a pair of feeder beams that illuminate adjacent regions can utilize a same RF frequency band, so long as they have orthogonal polarizations. Alternatively, each OMJ 266 adds either horizontal linear polarization or vertical linear polarization to the RF signal that is passed through the OMJ. Each feed element 268 converts the RF signal it receives, from a respective OMJ 266, to radio waves and feeds them to the rest of the antenna system to focus the signal into a service downlink beam. A feed element 268 and the rest of an antenna can be collectively referred to as the antenna subsystem. All or some of the feed elements 268 can share a common reflector. Such reflector(s) is/are not shown in the Figures, to simply the Figures.

The feed element 268_1 is coupled to a respective antenna element 269_1, the feed element 268_2 is coupled to a respective antenna element 269_2, . . . and the feed element 268_M is coupled to a respective antenna element 269_M. The feed elements 268_1 to 268_M form a multiple element antenna feed array. The antenna elements 269_1 to 269_M form a multiple element antenna array. The antenna elements 269_1 to 269_M can be referred to collectively the antenna elements 269, or individually as an antenna 269. Each of the analog transmit paths 272 can include more or less components than shown, and/or may include alternative components, depending upon implementation. Accordingly, embodiments of the present technology is not limited to use with the specific analog transmit paths shown.

Referring again to FIG. 2A, each analog receive path 232, of the plurality of analog receive paths 232_1 to 232_N, is configured to receive an RF signal via a respective antenna element 201 of an antenna array onboard the satellite 100, and is configured to condition the received RF signal before providing it to the RX beamformer 244. The conditioning of an RF signal that each analog receive path 232 performs can include filtering, frequency conversion and/or amplification of the RF signal traveling through the path, but is not limited thereto. Due to environmental variations, each analog receive path 232, of the plurality of analog receive paths 232_1 to 232_N, causes respective gain and phase deviations to the RF signal received by the analog receive path 232 before the RF signal is provided to the RX beamformer 244. If the gain and phase deviations for all of the analog receive paths 232 were the same, then the satellite 100 could easily track and handle the deviations. However, where beamforming is used, and the gain and phase deviations that occur in the different analog receive paths 232 differ from one another, then it is more difficult for a satellite to track and handle the deviations. As will be appreciated from the description below, certain embodiments of the present technology can be used to adjust gain and phase characteristics of the analog receive paths 232 to compensate for different gain and phase deviations being caused by different ones of the analog receive paths 232. While compensating for different gain and phase deviations being caused by different ones of the analog receive paths 232 is beneficial where beamforming is being performed, such compensation is also beneficial where beamforming is not being performed. For example, certain embodiments of the present technology can be used to adjust gain and phase characteristics of the analog receive paths 232 to compensate for different gain and phase deviations being caused by different ones of the analog receive paths 232, whether or not beamforming is being performed, in order to flatten and/or otherwise match the frequency responses among the multiple analog receive paths 232 and/or maintain stable and matched gains and phases among the multiple analog receive paths 232, as well as for other reasons.

Referring again to FIG. 2B, each analog transmit path 272, of the plurality of analog transmit paths 272_1 to 272_M, is configured to receive an RF signal from the TX beamformer 248 and condition the RF signal before providing it to a respective antenna element 269 of an antenna array onboard the satellite 100. The conditioning of an RF signal that each analog transmit path 272 performs can include filtering, frequency conversion and/or amplification of the RF signal traveling through the path, but is not limited thereto. Due to environmental variations, each analog transmit path 272, of the plurality of analog transmit paths 272_1 to 272_M, causes respective gain and phase deviations to the RF signal travelling through the analog transmit path 272 before the RF signal is provided to the respective antenna element 269. If the gain and phase deviations for all of the analog transmit paths 272 were the same, then a subscriber terminal ST could easily track and handle the deviations. However, where beamforming is used, and the gain and phase deviations that occur in the different analog transmit paths 272 differ from one another, then it is more difficult for a subscriber terminal ST to track and handle the deviations. As will be appreciated from the description below, certain embodiments of the present technology can be used to adjust gain and phase characteristics of the analog transmit paths 272 to compensate for different gain and phase deviations being caused by different ones of the analog transmit paths 272. While compensating for different gain and phase deviations being caused by different ones of the analog transmit paths 272 is beneficial where beamforming is being performed, such compensation is also beneficial where beamforming is not being performed. For example, certain embodiments of the present technology can be used to adjust gain and phase characteristics of the analog transmit paths 272 to compensate for different gain and phase deviations being caused by different ones of the analog transmit paths 272, whether or not beamforming is being performed, in order to flatten and/or otherwise match the frequency responses among the multiple analog transmit paths 272 and/or maintain stable and matched gains and phases among the multiple analog transmit paths 272, as well as for other reasons.

Figure 3A:
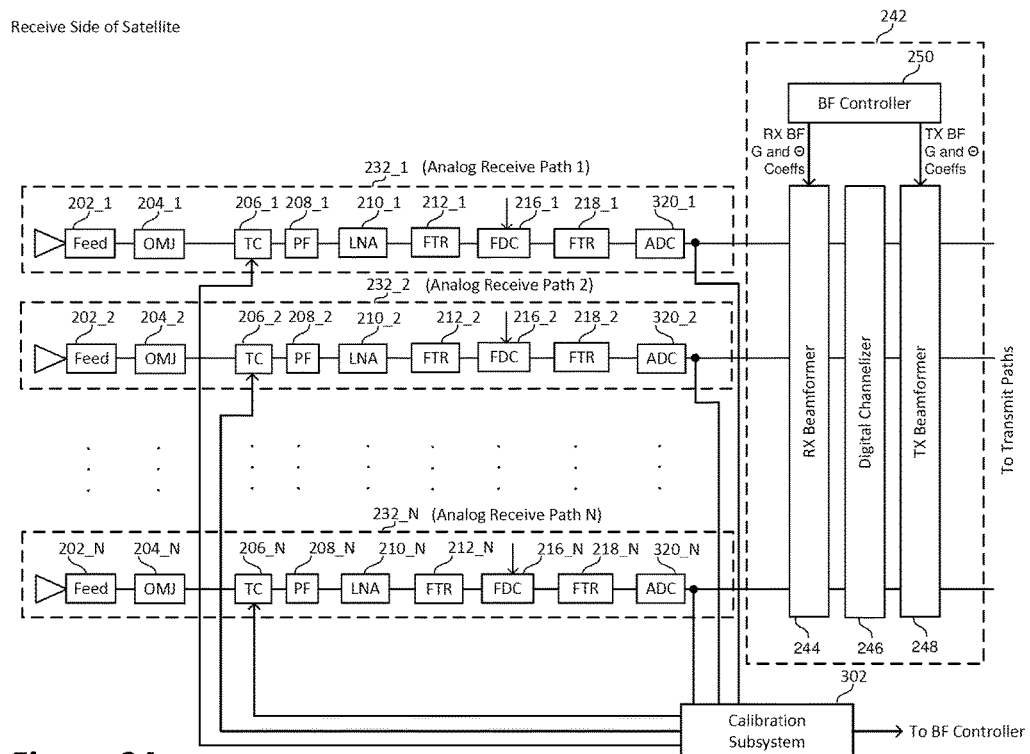
FIG. 3A shows a receive side of a satellite, according to an embodiment of the present technology, wherein a calibration signal is injected into each analog receive path using a coupler.

FIG. 3A will now be used to explain how certain embodiments of the present technology can be used to adjust gain and phase characteristics of analog receive paths to compensate for different gain and phase deviations being caused by different ones of the analog receive paths. Referring to FIG. 3A, the block diagram shown therein is similar to the block diagram shown in FIG. 2A, except that in FIG. 3A a calibration subsystem 302 is added onboard the satellite 100. In accordance with certain embodiments of the present technology, the calibration subsystem 302 is configured to inject a calibration signal into each analog receive path 232, of the plurality of analog receive paths 232, while the analog receive path is actively being used to receive and condition an RF signal. In order to inject the calibration signal into an analog receive path 232 while it is being used to receive and condition an RF signal, without adversely affecting a signal to noise ratio (SNR) of the RF signal, the injected calibration signal has a power level that is below a noise floor of the analog receive path 232 into which the calibration signal is injected. The calibration signal will contribute to the noise floor of the analog receive path 232 into which the calibration signal is being injected. In accordance with certain embodiments, dependent on the allowable rise in the noise floor of the analog receive path 232 due to the injected calibration signal, the calibration signal will be injected below the noise floor of the analog receive path 232. For example, in accordance with certain embodiments, the calibration signal is at least 5 dB below the noise floor of the analog receive path 232 into which the calibration signal is being injected. In accordance with certain embodiments, the calibration signal is at least 10 dB below the noise floor of the analog receive path 232 into which the calibration signal is being injected. Preferably, the calibration signal is about 17 dB below the noise floor of the analog receive path 232 into which the calibration signal is being injected. In FIG. 3A, the calibration signal, produced by the calibration subsystem 302, is shown as being injected into an analog receive path 232 using the test coupler 206 of the analog receive path, wherein the test coupler 206 is shown as being between the OMJ 204 and the PF 208 of the analog receive path 232. It would alternatively be possible to inject the calibration signal into an analog receive path 232 between the feed element 202 and the OMJ 204 of the analog receive path 232. Other variations are also possible and within the embodiments described herein. The noise floor in the analog receive paths 232 may be dominated by thermal noise, but is not limited thereto.

Still referring to FIG. 3A, as shown therein, the calibration subsystem 302 is also configured to extract that calibration signal from an analog receive path 232, after the calibration signal has traveled through the analog receive path 232 below the noise floor thereof. This enables the calibration subsystem 302 to compare the extracted calibration signal to the injected calibration signal to thereby determine the respective gain and phase deviations caused by the analog receive path 232, and more specifically, caused by components of the analog receive path 232 located between where the calibration signal was injected and extracted. The calibration subsystem 302 is also configured to adjust gain and phase characteristics of the analog receive paths 232, based on the gain and phase deviations determined for each of the analog receive paths 232, to thereby compensate for different gain and phase deviations being caused by different ones of the analog receive paths. This calibration subsystem 302 can do this, for example, by determining and applying gain and phase coefficients to compensate for different gain and phase deviations being caused by different ones of the analog receive paths 232. The gain and phase coefficients that are determined by the calibration subsystem 302 can be provided to the beamformer controller 250, and used by the beamformer controller 250 to adjust the transmit beamforming gain (G) and phase (θ) coefficients that the beamformer controller 250 provides to the RX beamformer 244 to control beamforming of RF signals received by the satellite.

As will be discussed in additional detail below, the calibration subsystem 302 can perform the calculations and/or other processing used to determine the gain and phase coefficients itself onboard the satellite 100. Alternatively, the calibration subsystem 302 that is onboard the satellite 100 can send information it obtains from the extracted calibration signals to a ground based calibration subsystem (e.g., co-located at a gateway 105), and the calculations used to determine the gain and phase coefficients can be determined on the ground and then transmitted back to the satellite 100 for use on the satellite 100. A benefit of this latter embodiment is it offloads processing from the satellite 100 to a ground based subsystem, thereby conserving the processing and power resources of the satellite 100. However, a benefit of the embodiment where the calculations and/or other processing used to determine the gain and phase coefficients are determined onboard the satellite 100 is that it minimizes the latency between when the gain and phase coefficients are determined and applied. In accordance with certain embodiments, such as the embodiment shown in FIG. 3A, the calibration signal is injected into each analog receive path 232 via a coupler (e.g., the TC 206) of each analog receive path 232. In alternative embodiments, such as the embodiment discussed below with reference FIG. 4A, the calibration signal is emitted by a transmission probe to thereby cause the calibration signal to be simultaneously injected into the plurality of analog receive paths 232.

Figure 3B:
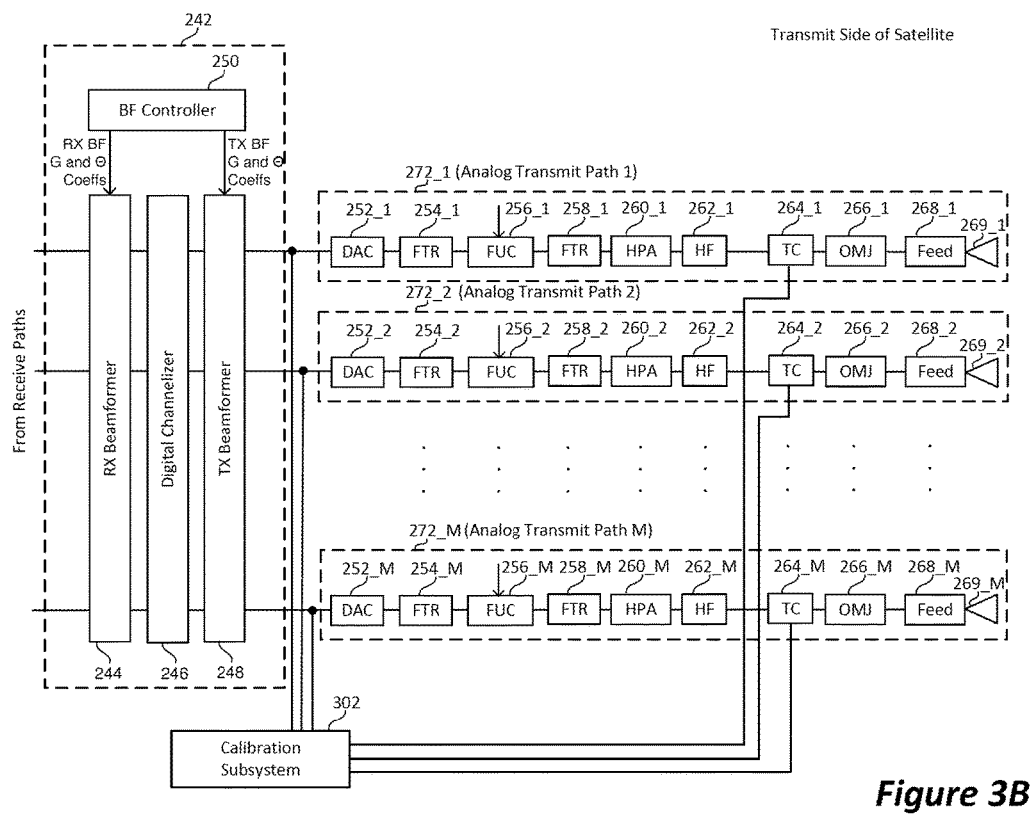
FIG. 3B shows a transmit side of a satellite, according to an embodiment of the present technology, wherein a calibration signal is injected into each analog transmit path and the calibration signal is extracted from each analog transmit path using a coupler.

FIG. 3B will now be used to explain how certain embodiments of the present technology can be used to adjust gain and phase characteristics of analog transmit paths to compensate for different gain and phase deviations being caused by different ones of the analog transmit paths. Referring to FIG. 3B, the block diagram shown therein is similar to the block diagram shown in FIG. 2B, except that in FIG. 3B the calibration subsystem 302 is added onboard the satellite 100. In accordance with certain embodiments of the present technology, the calibration subsystem 302 is configured to inject a calibration signal into each analog transmit path 272, of the plurality of analog transmit paths 272, while the analog transmit path is actively being used to condition and transmit an RF signal. In order to inject the calibration signal into an analog transmit path 272 while it is being used to condition and transmit an RF signal, without adversely affecting a SNR of the RF signal, the injected calibration signal has a power level that is below a noise floor of the analog transmit path 272 into which the calibration signal is injected. The calibration signal will contribute to the noise floor of the analog transmit path 272 into which the calibration signal is being injected. In accordance with certain embodiments, dependent on the allowable rise in noise floor of the analog transmit path 272 due to the injected calibration signal, the calibration signal will be injected below the noise floor of the analog transmit path 272. For example, in accordance with certain embodiments, the calibration signal is at least 5 dB below the noise floor of the analog transmit path 272 into which the calibration signal is being injected. In accordance with certain embodiments, the calibration signal is at least 10 dB below the noise floor of the analog transmit path 272 into which the calibration signal is being injected. Preferably, the calibration signal is about 17 dB below the noise floor of the analog transmit path 272 into which the calibration signal is being injected. In FIG. 3B, the calibration signal, produced by the calibration subsystem 302, is shown as being injected into an analog transmit path upstream of the DAC 252 in the path, but other variations are possible. The noise floor in the analog transmit paths 272 may be dominated by thermal noise, but is not limited thereto.

Still referring to FIG. 3B, as shown therein, the calibration subsystem 302 is also configured to extract that calibration signal from an analog transmit path 272, after the calibration signal has traveled through at least a portion of the analog transmit path 272 below the noise floor thereof. This enables the calibration subsystem 302 to compare the extracted calibration signal to the injected calibration signal to thereby determine the respective gain and phase deviations caused by the analog transmit path 272, and more specifically, caused by components of the analog transmit path 272 located between where the calibration signal was injected and extracted. The calibration subsystem 302 is also configured to adjust gain and phase characteristics of the analog transmit paths 272, based on the gain and phase deviations determined for each of the analog transmit paths 272, to thereby compensate for different gain and phase deviations being caused by different ones of the analog transmit paths. This calibration subsystem 302 can do this, for example, by determining and applying gain and phase coefficients to compensate for different gain and phase deviations being caused by different ones of the analog transmit paths 272. The gain and phase coefficients that are determined by the calibration subsystem 302 can be provided to the beamformer controller 250, and used by the beamformer controller 250 to adjust the transmit beamforming gain (G) and phase (θ) coefficients that the beamformer controller 250 provides to the TX beamformer 248 to control beamforming of RF signals transmitted by the satellite.

As will be discussed in additional detail below, the calibration subsystem 302 can perform the calculations and/or other processing used to determine the gain and phase coefficients itself onboard the satellite 100. Alternatively, the calibration subsystem 302 that is onboard the satellite 100 can send information it obtains from the extracted calibration signals to a ground based calibration subsystem (e.g., co-located at a gateway 105), and the calculations used to determine the gain and phase coefficients can be determined on the ground and then transmitted back to the satellite 100 for use on the satellite 100. A benefit of this latter embodiment is it offloads processing from the satellite 100 to a ground based subsystem, thereby conserving the processing and power resources of the satellite 100. However, a benefit of the embodiment where the calculations and/or other processing used to determine the gain and phase coefficients are determined onboard the satellite 100 is that it minimizes the latency between when the gain and phase coefficients are determined and applied. In accordance with certain embodiments, such as the embodiment shown in FIG. 3B, the calibration signal is extracted from each analog transmit path 272 via a coupler (e.g., the TC 264) of each analog transmit path 272. In alternative embodiments, such as the embodiment discussed below with reference FIG. 4B, the calibration signal is extracted by a reception probe.

In accordance with certain embodiments, the calibrations signals that are injected into the analog receive paths 232 in FIG. 3A and the analog transmit paths 272 in FIG. 3B can be produced using a pseudo-noise (PN) sequence. The PN sequence that is injected into the analog transmit paths 272 can be the same, or different, then the PN sequence this is injected into the analog receive paths 232. The PN sequence(s) can be produced by a PN sequence generator within the calibration subsystem 302. Alternatively, one or more PN sequence(s) that is/are predetermined, which is/are used over and over, can be stored in a memory or register of the calibration subsystem 302. In accordance with certain embodiments, the calibration signal that is injected into each analog receive path 232, of the plurality of analog receive paths 232, has a bandwidth that is equal to or less than a bandwidth of the analog receive path into which the calibration signal is injected. Similarly, the calibration signal that is injected into each analog transmit path 272, of the plurality of analog transmit paths 272, can have a bandwidth that is equal to or less than a bandwidth of the analog transmit path into which the calibration signal is injected.

In accordance with certain embodiments, where a calibration signal is a PN sequence, the PN sequence can be passed through a root-raised-cosine (RRC) filter (sometimes known as square-root-raised-cosine filter (SRRC)) before it is injected into an analog receive path 232 (or an analog transmit path 272), in order to reduce intersymbol interference (ISI). The RRC filter can also be used to limit the bandwidth of the calibration signal to a desired bandwidth.

Referring again to FIG. 3A, where the calibration signal is injected into each analog receive path 232 using a coupler (e.g., the TC 206) within the analog receive path 232, the calibration subsystem 302 can include a switch or multiplexer that is controlled to specify into which of the plurality of analog receive paths 232 the calibration signal is being injected at any specific time. Similarly, a further switch or demultiplexer can be controlled to specify from which of the plurality of analog receive paths 232 the calibration signal is being extracted at any specific time. For example, the switches, multiplexers and/or demultiplexers can be controlled to inject and extract the calibration signal into and from the analog receive path 232_1 during a first period of time, and to inject and extract the calibration signal into and from the analog receive path 232_2 during a second period of time, . . . and to inject and extract the calibration signal into and from the analog receive path 232_N during an Nth period of time. For each of the analog receive paths 232, the calibration subsystem 302 can determine how the analog receive path 232 affects the gain and the phase of the calibration signal between the points at which calibration signal was injected and extracted from the analog receive path 232. Based thereon, the calibration subsystem 302 can determine how the separate analog receive paths 232 differently cause gain and phase deviations, and can communicate with the beamformer controller 250 to compensate for such deviations.

Referring again to FIG. 3B, the calibration subsystem 302 can include a switch or multiplexer that is controlled to specify into which of the plurality of analog transmit paths 272 the calibration signals is being injected at any specific time. A further switch or demultiplexer can be controlled to specify from which of the plurality of analog transmit paths 272 the calibration signal is being extracted at any specific time. For example, the switches, multiplexers and/or demultiplexers can be controlled to inject and extract the calibration signal into and from the analog transmit path 272_1 during a first period of time, and to inject and extract the calibration signal into and from the analog transmit path 272_2 during a second period of time, . . . and to inject and extract the calibration signal into and from the analog transmit path 232_M during an Mth period of time. For each of the analog transmit paths 272, the calibration subsystem 302 can determine how the analog transmit path 272 affects the gain and the phase of the calibration signal between the points at which calibration signal was injected and extracted from the analog transmit path 272. Based thereon, the calibration subsystem 302 can determine how the separate analog transmit paths 272 differently cause gain and phase deviations, and can communicate with the beamformer controller 250 to compensate for such deviations.

Figure 4A:
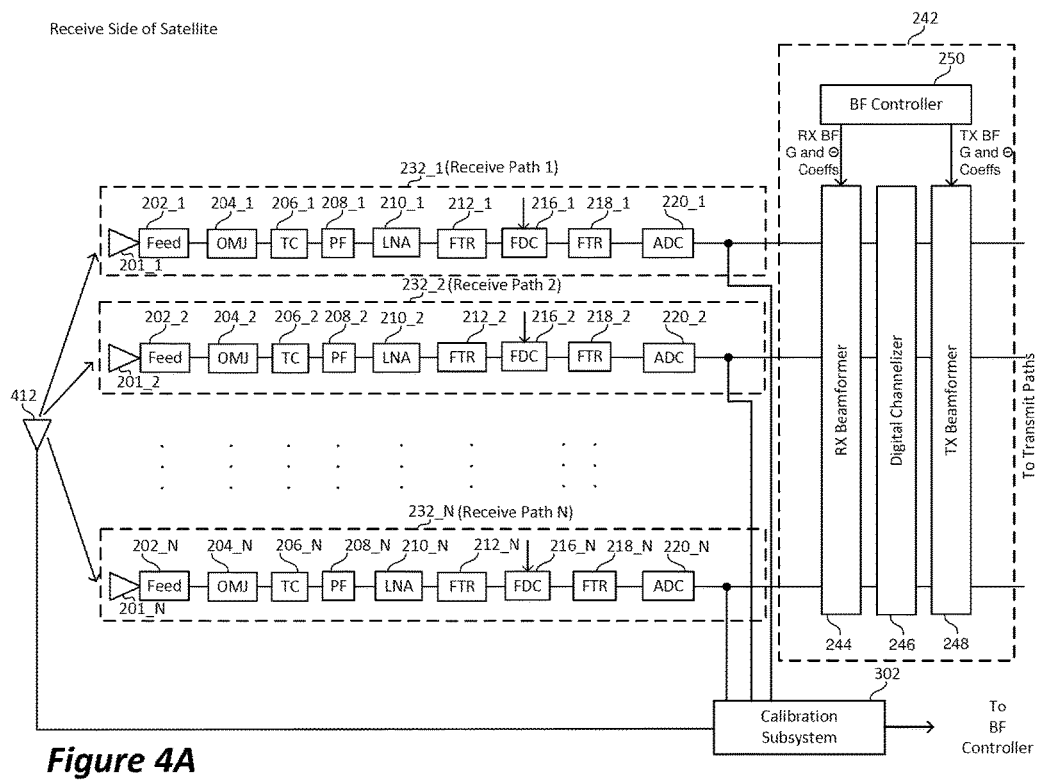
FIG. 4A shows a receive side of a satellite, according to an embodiment of the present technology, wherein a calibration signal is injected into each analog receive path using a transmission probe.

FIG. 4A will now be used to described how a calibration signal can alternatively be emitted by a transmission probe to thereby cause the calibration signal to be simultaneously injected into a plurality of analog receive paths, rather than coupling the calibration signal into each of the analog receive paths using couplers. Referring to FIG. 4A, the calibration subsystem 302 provides a calibration signal to a transmission probe 412, which can be a simple antenna element, but is not limited thereto, so that the transmission probe 412 emits the calibration signal such that the calibrations signal can be simultaneously received by the plurality of antenna elements 201_1 through 201_N. The calibration subsystem 302 can uses switches or a demultiplexer to extract the calibration signal from the receive path 232_1 during a first period of time, to extract the calibration signal from the receive path 232_2 during a second period of time, . . . and to extract the calibration signal from the analog receive path 232_N during an Nth period of time. For each of the analog receive paths 232, the calibration subsystem 302 can determine how the analog receive path 232 affects the gain and the phase of the calibration signal between the points at which calibration signal was injected and extracted from the analog receive path 232. Based thereon, the calibration subsystem 302 can determine how the separate analog receive paths 232 differently cause gain and phase deviations, and can communicate with the beamformer controller 250 to compensate for such deviations. Alternatively, rather than communicate with a beamformer controller to compensate for such deviations, each of the analog receive paths 232 can include a respective equalizer and the calibration subsystem 302 can communicate with one or more of the equalizers to compensate for gain and phase deviations. Referring to FIG. 4A, a respective analog equalizer (not shown) can be located within each analog receive path 232 upstream of the ADC 220 of the path (e.g., between the FTR 218 and the ADC 220), or a respective digital equalizer (not shown) can be located downstream of the ADC 220 of the path (e.g., between the ADC 220 and the signal processing circuitry 242), but is not limited thereto. In the embodiment summarized with reference to FIG. 4A, the calibration signal is still considered to be injected into an analog receive path 232 when the transmission probe 412 is used for the injecting, even though the transmission probe 412 is upstream of the antenna element 201 of the analog receive path 232. Preferably the transmission probe 412 is physically relatively close to the antenna elements 201, e.g., within a few meters.

Figure 4B:
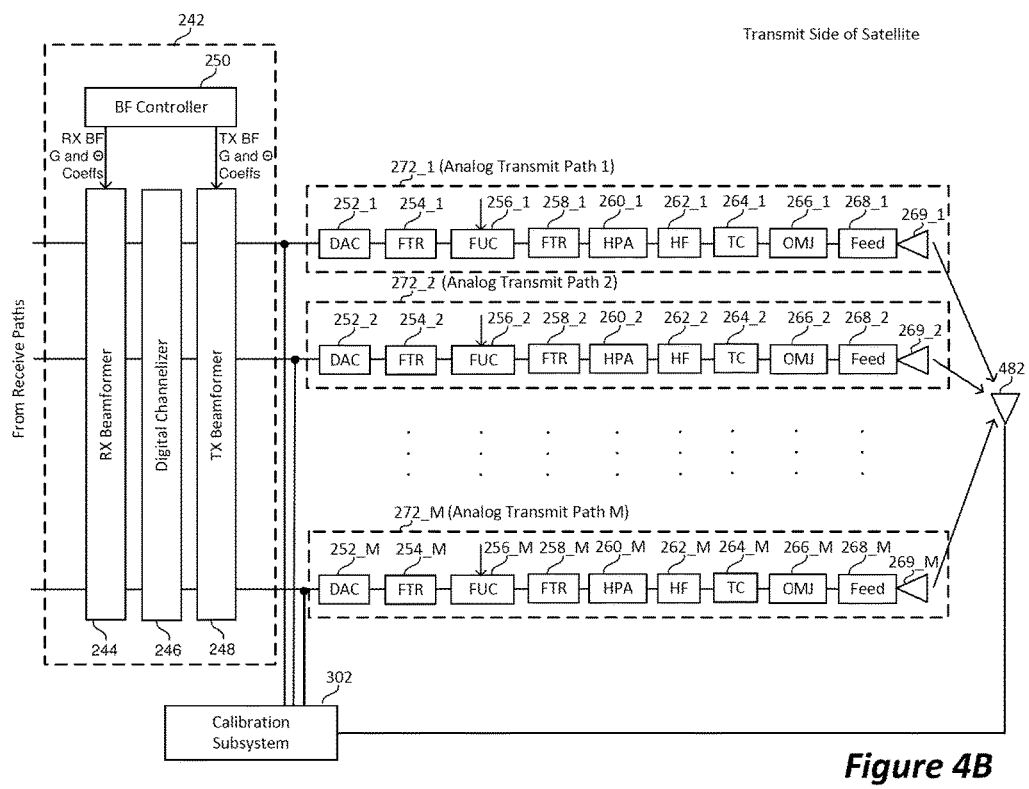
FIG. 4B shows a transmit side of a satellite, according to an embodiment of the present technology, wherein a calibration signal is extracted from each analog transmit path using a reception probe.

FIG. 4B will now be used to described how a calibration signal can alternatively be extracted from the analog transmit paths 272 using a reception probe, rather than using couplers (e.g., TCs 264) included in each of the analog transmit paths 272. Referring to FIG. 4B, in the embodiment shown therein, the calibration subsystem 302 extracts the calibration signal using a reception probe 482, which can be a simple antenna element, but is not limited thereto. During a first period of time the calibration subsystem 302 can uses switches, a multiplexer and/or a demultiplexer to inject the calibration signal into the analog transmit path 272_1 and use the reception probe 482 to extract the calibration signal from the analog transmit path 272_1, during a second first period of time the calibration subsystem 302 can uses the switches, multiplexer and/or demultiplexer to inject the calibration signal into the analog transmit path 272_2 and use the reception probe 482 to extract the calibration signal from the analog transmit path 272_2, . . . and during an Mth period of time the calibration subsystem 302 can uses the switches, multiplexer and/or demultiplexer to inject the calibration signal into the analog transmit path 272_M and use the reception probe 482 to extract the calibration signal from the analog transmit path 272_M. For each of the analog transmit paths 272, the calibration subsystem 302 can determine how the analog transmit path 272 affects the gain and the phase of the calibration signal between the points at which calibration signal was injected and extracted from the analog transmit path 272. Based thereon, the calibration subsystem 302 can determine how the separate analog transmit paths 272 differently cause gain and phase deviations, and can communicate with the beamformer controller 250 to compensate for such deviations. Alternatively, rather than communicate with a beamformer controller to compensate for such deviations, each of the analog transmit paths 272 can include a respective equalizer and the calibration subsystem 302 can communicate with one or more of the equalizers to compensate for gain and phase deviations. Referring to FIG. 4B, a respective analog equalizer (not shown) can be located within each analog transmit path 272 upstream of the DCC 252 of the path (e.g., between the signal processing circuitry 242 and the DAC 252), or a respective digital equalizer (not shown) can be located downstream of the DAC 252 of the path (e.g., between the DAC 252 and the FTR 254), but is not limited thereto. In the embodiment summarized with reference to FIG. 4B, the calibration signals is still considered to be extracted from an analog transmit path 272 when the reception probe 482 is used is used for the extracting, even though the reception probe 482 is downstream of the antenna element 269 of the analog transmit path 272. The reception probe 482 is preferably physically relatively close to the antenna element 269, e.g., within a few meters.

Figure 5:
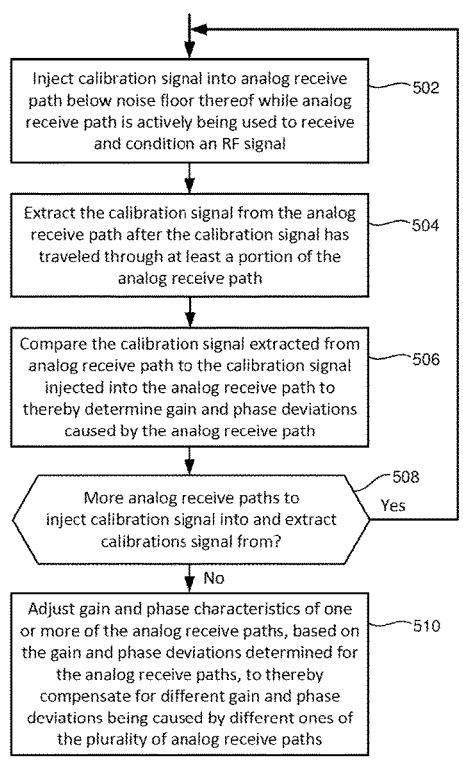
FIG. 5 is a high level flow diagram that is used to summarize methods for injecting and extracting calibration signals into a plurality of analog receive paths onboard a satellite that also include a beamformer in order to determine the respective gain and phase deviations caused by the analog receive paths and in order to compensate for different gain and phase deviations being caused by different ones of the analog receive paths.

The high level flow diagram of FIG. 5 will now be used to describe methods according to certain embodiments of the present technology, wherein such methods are for use with a satellite (e.g., 100) that includes analog receive paths (e.g., 232) and a beamformer (e.g., 244) onboard the satellite. In accordance with certain embodiments, each of the analog receive paths (e.g., 232) is configured to receive an RF signal via a respective antenna element (e.g., 201) of an antenna array onboard the satellite, and is configured to condition the received RF signal before providing it to the beamformer (e.g., 244). Due to environmental variations, each of the analog receive paths (e.g., 232) causes respective gain and phase deviations to an RF signal received by the analog receive path before the RF signal is provided to the beamformer (e.g., 244).

Referring to FIG. 5, step 502 involves injecting a calibration signal into an analog receive path while the analog receive path is actively being used to receive and condition an RF signal. In order to inject the calibration signal into an analog receive path while it is actively being used to receive and condition an RF signal, without adversely affecting the RF signal, the injected calibration signal has a power level that is below a noise floor of the analog receive path (e.g., 232) into which the calibration signal is injected. In accordance with certain embodiments, the calibration signal injected at step 502 is at least 5 dB below the noise floor of the analog receive path into which the calibration signal is being injected. In accordance with certain embodiments, the calibration signal is at least 10 dB below the noise floor of the analog receive path into which the calibration signal is being injected. Preferably, the calibration signal is about 17 dB below the noise floor of the analog receive path into which the calibration signal is being injected. In accordance with certain embodiments, at step 502 a calibration signal can be injected into an analog receive path (e.g., 232) using a coupler (e.g., 206) of the analog receive path into which the calibration signal is being injected. In accordance with other embodiments, at step 502 a transmission probe (e.g., 412) onboard the satellite can be used to simultaneously inject a calibration signal into a plurality of analog receive paths.

Still referring to FIG. 5, step 504 involves extracting the calibration signal from the analog receive path (e.g., 232) after the calibration signal has traveled through at least a portion of the analog receive path. Additional details of step 504, according to certain embodiments of the present technology, are described below with reference to FIG. 6.

Step 506 involves comparing the calibration signal extracted from the analog receive path to the calibration signal injected into the analog receive path to thereby determine gain and phase deviations caused by the analog receive path. In accordance with certain embodiments, step 506 is performed by a calibration subsystem (e.g., 302) onboard the satellite. It would also be possible that step 506, or a portion thereof, be performed by a ground based subsystem (e.g., co-located with a gateway 105, but not limited thereto) that performs step 506 (or a portion thereof) based on information that is downlinked from the satellite (e.g., 100). The ground based subsystem can then uplink to the satellite results of processing performed by the ground based subsystem.

At step 508 there is a determination of whether there are additional analog receive paths into which the calibration signal should be injected and then extracted therefrom, for the purpose of determining gain and phase deviations caused by the analog receive path. If the answer to the determination at step 508 is Yes, then steps 502, 504, and 506 are repeated one or more times for additional analog receive paths. If the answer to the determination at step 508 is No, then step 510 is performed.

Still referring to FIG. 5, step 510 involves adjusting gain and phase characteristics of one or more analog receive paths (e.g., 232) based on the gain and phase deviations determined for each of the analog receive paths, to thereby compensate for different gain and phase deviations being caused by different ones of the plurality of analog receive paths. In accordance with certain embodiments, step 510 includes adjusting gain and phase characteristics of the analog receive paths by applying gain and phase coefficients to compensate for different gain and phase deviations being caused by different ones of the analog receive paths. Referring briefly back to FIGS. 3A and 4A, such gain and phase coefficients can be applied by the BF controller 250, based on information and/or instructions provided to the BF controller 250 by the calibration subsystem 302. It would also be possible that a portion of step 510 be performed by a ground based subsystem (e.g., co-located with a gateway 105, but not limited thereto) based on information that is downlinked from the satellite (e.g., 100). The ground based subsystem can then uplink to the satellite results of processing performed by the ground based subsystem. In certain embodiments, beamforming coefficients are selected or modified to compensate for different gain and phase deviations being caused by different ones of the plurality of analog receive paths. Alternatively, gain and phase characteristics of one or more analog receive paths can be adjusted using equalizers within the analog receive paths to compensate for different gain and phase deviations being caused by different ones of the analog receive paths, as was noted above in the discussion of FIG. 4A.

Figure 6:
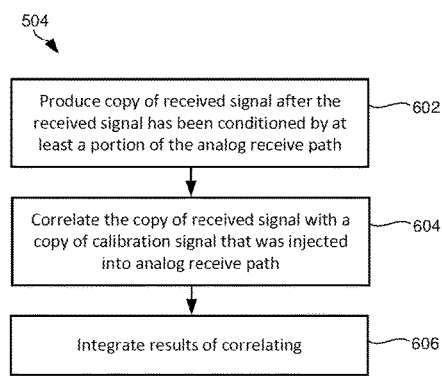
FIG. 6 is a high level flow diagram that is used to describe additional details of one of the steps introduced with reference to FIG. 5, according to certain embodiments of the present technology.

Additional details of step 504, according to certain embodiments of the present technology, will now be described with reference to FIG. 6. Referring to FIG. 6, step 602 involves producing a copy of the received signal after it has been conditioned by the analog receive path. For example, referring to FIGS. 3A and 4A, an instance of step 602 can involve providing a copy of the signal received by the analog receive path 232_1 to the calibration subsystem 302, after the received signal has been filtered (by the filters 208_1, 212_1 and 218_1), amplified (by the LNA 210_1), frequency converted (by the FDC 216_1), and converted to a digital signal by the ADC 320_1. Additional instances of step 602 can be performed for the other analog receive paths 232_2 through 232_N.

Referring again to FIG. 6, step 604 involves correlating the copy of the received signal with a copy of the calibration signal that was injected into an analog receive path, and step 606 involves integrating results of the correlating performed at step 604 in order to bring the calibration signal above the noise floor of the analog receive path. The length of time that a calibration signal is injected into an analog receive path at step 502, and integrated at step 606 (which is a sub-step of the extracting step 504) can be predetermined for a system, or can be determined in real or near real time, depending upon implementation. For example, the integrating can be performed for anywhere between a few tens of seconds to a few minutes per analog receive path, but is not limited thereto. The lower the calibration signal is below the noise floor of the analog receive path, the longer that the integrating may need to be performed.

Figure 7:
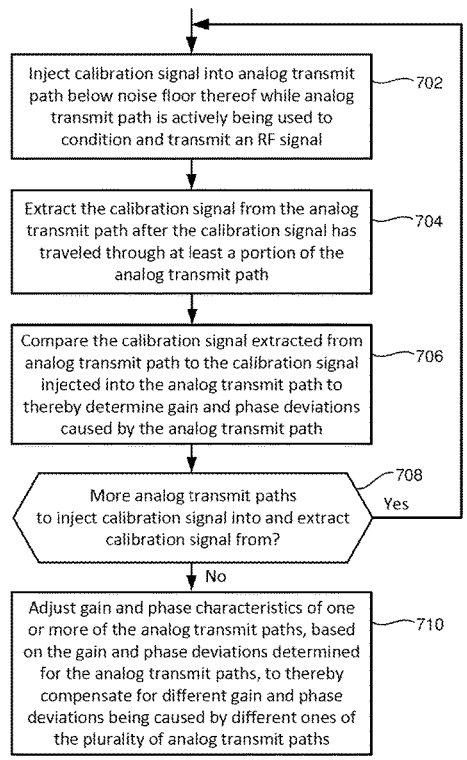
FIG. 7 is a high level flow diagram that is used to summarize methods for injecting and extracting calibration signals into a plurality of analog transmit paths onboard a satellite that also include a beamformer in order to determine the respective gain and phase deviations caused by the analog transmit paths and in order to compensate for different gain and phase deviations being caused by different ones of the analog transmit paths.

The high level flow diagram of FIG. 7 will now be used to describe methods according to certain embodiments of the present technology, wherein such methods are for use with a satellite (e.g., 100) that includes a beamformer (e.g., 248) and analog transmit paths (e.g., 272) onboard the satellite. In accordance with certain embodiments, each of the analog transmit paths (e.g., 272) is configured to condition an RF signal received from the beamformer (e.g., 248) and transmit the RF signal via a respective antenna element (e.g., 269) of an antenna array onboard the satellite. Due to environmental variations, each of the analog transmit paths (e.g., 272) causes respective gain and phase deviations to an RF signal that travels through the analog transmit path before the RF signal is provided to the antenna element (e.g., 269).

Referring to FIG. 7, step 702 involves injecting a calibration signal into an analog transmit path while the analog transmit path is actively being used to condition and transmit an RF signal. In order to inject the calibration signal into an analog transmit path while it is actively being used to condition and transmit an RF signal, without adversely affecting the RF signal, the injected calibration signal has a power level that is below a noise floor of the analog transmit path (e.g., 272) into which the calibration signal is injected. In accordance with certain embodiments, the calibration signal injected at step 702 is at least 5 dB below the noise floor of the analog transmit path into which the calibration signal is being injected. In accordance with certain embodiments, the calibration signal is at least 10 dB below the noise floor of the analog transmit path into which the calibration signal is being injected. Preferably, the calibration signal is about 17 dB below the noise floor of the analog transmit path into which the calibration signal is being injected.

Still referring to FIG. 7, step 704 involves extracting the calibration signal from the analog transmit path (e.g., 272) after the calibration signal has traveled through at least a portion of the analog transmit path. In accordance with certain embodiments, at step 704 a calibration signal can be extracted from an analog receive path (e.g., 272) using a coupler (e.g., 264) of the analog transmit path from which the calibration signal is being extracted. In accordance with other embodiments, at step 704 a reception probe (e.g., 482) onboard the satellite can be used to extract a calibration signal from an analog transmit path. Additional details of step 704, according to certain embodiments of the present technology, are described below with reference to FIG. 8.

Step 706 involves comparing the calibration signal extracted from the analog transmit path to the calibration signal injected into the analog transmit path to thereby determine gain and phase deviations caused by the analog transmit path. In accordance with certain embodiments, step 706 is performed by a calibration subsystem (e.g., 302) onboard the satellite. It would also be possible that step 706, or a portion thereof, be performed by a ground based subsystem (e.g., co-located with a gateway 105, but not limited thereto) that performs step 706 (or a portion thereof) based on information that is downlinked from the satellite (e.g., 100). The ground based subsystem can then uplink to the satellite results of processing performed by the ground based subsystem.

At step 708 there is a determination of whether there are additional analog transmit paths into which the calibrations signal should be injected and then extracted therefrom, for the purpose of determining gain and phase deviations caused by the analog transmit path. If the answer to the determination at step 708 is Yes, then steps 702, 704, and 706 are repeated one or more times for additional analog transmit paths. If the answer to the determination at step 708 is No, then step 710 is performed.

Still referring to FIG. 7, step 710 involves adjusting gain and phase characteristics of one or more analog transmit paths (e.g., 272) based on the gain and phase deviations determined for each of the analog transmit paths, to thereby compensate for different gain and phase deviations being caused by different ones of the plurality of analog transmit paths. In accordance with certain embodiments, step 710 includes adjusting gain and phase characteristics of the analog transmit paths by applying gain and phase coefficients to compensate for different gain and phase deviations being caused by different ones of the analog transmit paths. Referring briefly back to FIGS. 3B and 4B, such gain and phase coefficients can be applied by the BF controller 250, based on information and/or instructions provided to the BF controller 250 by the calibration subsystem 302. It would also be possible that a portion of step 710 be performed by a ground based subsystem (e.g., co-located with a gateway 105, but not limited thereto) based on information that is downlinked from the satellite (e.g., 100). The ground based subsystem can then uplink to the satellite results of processing performed by the ground based subsystem. In certain embodiments, beamforming coefficients are selected or modified to compensate for different gain and phase deviations being caused by different ones of the plurality of analog transmit paths. Alternatively, gain and phase characteristics of one or more analog transmit paths can be adjusted using equalizers within the analog transmit paths to compensate for different gain and phase deviations being caused by different ones of the analog transmit paths, as was noted above in the discussion of FIG. 4B.

Figure 8:
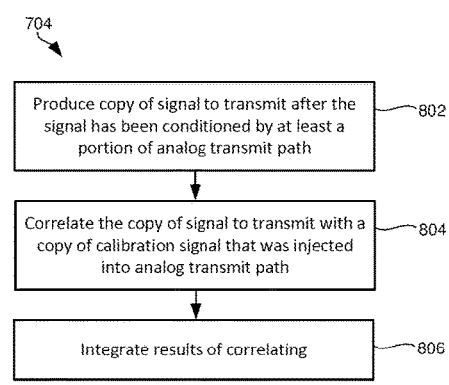
FIG. 8 is a high level flow diagram that is used to describe additional details of one of the steps introduced with reference to FIG. 7, according to certain embodiments of the present technology.

Additional details of step 704, according to certain embodiments of the present technology, will now be described with reference to FIG. 8. Referring to FIG. 8, step 802 involves producing a copy of signal that is to be conditioned and transmitted by the analog transmit path. For example, referring to FIGS. 3B and 4B, an instance of step 802 can involve producing a copy of a signal that is output by the beamformer 248 after the signal has been conditioned by at least a portion of the analog transmit path 272_1. Such conditioning of the signal can include filtering (e.g., by the filters 254_1, 258_1 and 262_1), amplifying (e.g., by the HPA 260_1), and frequency converting (by the FUC 256_1). Additional instances of step 802 can be performed for the other analog transmit paths 272_2 through 272_M.

Referring again to FIG. 8, step 804 involves correlating the copy of the conditioned signal to be transmitted with a copy of the calibration signal that was injected into an analog transmit path, and step 806 involves integrating results of the correlating performed at step 804 in order to bring the calibration signal above the noise floor of the analog transmit path. The length of time that a calibration signal is injected into an analog transmit path at step 702, and integrated at step 806 (which is a sub-step of the extracting step 704) can be predetermined for a system, or can be determined in real or near real time, depending upon implementation. For example, the integrating can be performed for anywhere between a few tens of seconds to a few minutes per analog transmit path, but is not limited thereto. The lower the calibration signal is below the noise floor of the analog transmit path, the longer that the integrating may need to be performed.

Further details of the methods described with reference to FIGS. 5 through 8 can be appreciated from the above description of FIGS. 1 through 4B.

In certain embodiments, a calibration signal that is injected into analog receive paths is essentially a tone that is spread using a PN sequence. Similarly, in certain embodiments, a calibration signal that is injected into analog transmit paths is essentially a tone that is spread using a PN sequence.

In certain embodiments, the same calibration signal can be injected into multiple analog receive paths, whether at the same time or at different times. In other embodiments, different calibrations signals can be injected into different analog receive paths, whether at the same time or different times.

In certain embodiments, the same calibration signal can be injected into multiple analog transmit paths, whether at the same time or at different times. In other embodiments, different calibrations signals can be injected into different analog transmit paths, whether at the same time or different times.

The calibration signal(s) that is/are injected into analog receive paths can be the same or different than the calibration signal(s) that is/are injected into the analog transmit paths, depending upon implementation.

In certain embodiments, a calibration signal is injected into only one of a plurality of analog receive paths at a time. In other embodiments a calibration signal is injected into multiple analog receive paths at a time. In certain embodiments the calibration signal is extracted from only one of a plurality of analog receive paths at a time. In other embodiments, a calibration signal is extracted from multiple analog receive paths at a time.

In certain embodiments, a calibration signal is injected into only one of a plurality of analog transmit paths at a time. In other embodiments a calibration signal is injected into multiple analog transmit paths at a time. In certain embodiments the calibration signal is extracted from only one of a plurality of analog transmit paths at a time. In other embodiments, a calibration signal is extracted from multiple analog transmit paths at a time.

Certain embodiments described herein relate to a communication system including a plurality of analog receive paths and signal processing equipment onboard a satellite. Each analog receive path, of the plurality of analog receive paths, is configured to receive an RF signal via a respective antenna element of an antenna array onboard the satellite, and is configured to condition the received RF signal before providing it to signal processing equipment downstream of the analog receive paths. Due to environmental variations, each analog receive path, of the plurality of analog receive paths, causes respective gain and phase deviations to the RF signal received by the analog receive path before the RF signal is provided to the signal processing equipment. The communication system also includes a calibration subsystem onboard the satellite and configured to inject a calibration signal into each analog receive path, of the plurality of analog receive paths, while the analog receive path is actively being used to receive and condition an RF signal. The calibration signal, injected into each analog receive path, of the plurality of analog receive paths, has a power level that is below a noise floor of the analog receive path into which the calibration signal is injected. For each analog receive path, of the plurality of analog receive paths, the calibration subsystem is also configured to extract the calibration signal and compare the extracted calibration signal to the injected calibration signal to thereby determine the respective gain and phase deviations caused by the analog receive path. The calibration subsystem is also configured to adjust gain and phase characteristics of one or more of the analog receive paths based on the gain and phase deviations determined for each of the plurality of analog receive paths to thereby compensate for different gain and phase deviations being caused by different ones of the analog receive paths.

In accordance with certain embodiments, the calibration signal, that is injected into each analog receive path of the plurality of analog receive paths, is injected into the analog receive path via a coupler of the analog receive path.

In accordance with certain embodiments that system further includes a transmission probe onboard the satellite, and the calibration subsystem causes the calibration signal to be emitted by the transmission probe to thereby cause the calibration signal to be simultaneously injected into the plurality of analog receive paths.

In accordance with certain embodiments, the calibration subsystem is configured to adjust gain and phase characteristics of the analog receive paths by applying gain and phase coefficients to compensate for different gain and phase deviations being caused by different ones of the analog receive paths.

In accordance with certain embodiments, the calibration signal that is injected into each analog receive path, of the plurality of analog receive paths, has a bandwidth that is equal to or less than a bandwidth of the analog receive path into which the calibration signal is injected.

In accordance with certain embodiments, the calibration signal that is injected into each analog receive path, of the plurality of analog receive paths, is produced using a pseudo-noise (PN) sequence.

In accordance with certain embodiments, for each analog receive path, of the plurality of analog receive paths, the calibration subsystem is configured to extract the calibration signal from the analog receive path by producing a copy of a received signal after the received signal has been conditioned by the analog receive path, correlating the copy of the received signal with a copy of the calibration signal that was injected into the analog receive path, and integrating results of the correlating.

In accordance with certain embodiments, each analog receive path, of the plurality of analog receive paths, includes at least one of the following components, each of which due to environmental variations can contribute to the gain and phase deviations to the RF signal received by the analog receive path before the RF signal is provided to the beamformer: a filter; an amplifier; or a frequency converter.

In accordance with certain embodiments, the gain and phase deviations caused by the analog receive paths, which are determined by the calibration subsystem, are downlinked to a ground subsystem including one or more processors that determine adjustments to be made to gain and phase characteristics of the analog receive paths and then uplinks the adjustments to the satellite so that the calibration subsystem can adjust the gain and phase characteristics of the analog receive paths.

In accordance with certain embodiments, the calibration subsystem onboard the satellite determines the adjustments to be made to gain and phase characteristics of the analog receive paths.

Certain embodiments described herein relate to a communication system including signal processing equipment and a plurality of analog transmit paths onboard a satellite. Each analog transmit path, of the plurality of analog transmit paths, is configured to receive an RF signal from the signal processing equipment and condition the RF signal before providing it to a respective antenna element of an antenna array onboard the satellite. Due to environmental variations, each analog transmit path, of the plurality of analog transmit paths, causes respective gain and phase deviations to the RF signal travelling through the analog transmit path before the RF signal is provided to the respective antenna element. The communication system also includes a calibration subsystem onboard the satellite and configured to inject a calibration signal into each analog transmit path, of the plurality of analog transmit paths, while the analog transmit path is actively being used to condition and transmit an RF signal. The calibration signal, injected into each analog transmit path, of the plurality of analog transmit paths, has a power level that is below a noise floor of the analog transmit path into which the calibration signal is injected. For each analog transmit path, of the plurality of analog transmit paths, the calibration subsystem is also configured to extract the calibration signal and compare the extracted calibration signal to the injected calibration signal to thereby determine the respective gain and phase deviations caused by the analog transmit path. The calibration subsystem is also configured to adjust gain and phase characteristics of one or more of the analog transmit paths based on the gain and phase deviations determined for each of the plurality of analog transmit paths to thereby compensate for different gain and phase deviations being caused by different ones of the analog transmit paths.

In accordance with certain embodiments, the calibration signal, that is injected into each analog transmit path of the plurality of analog transmit paths, is injected into the analog transmit path via a coupler of the analog transmit path.

In accordance with certain embodiments, the system also includes a reception probe onboard the satellite, wherein the reception probe is configured to receive RF signals, transmitted by the antenna elements of the antenna array, and configured to provide a received RF signal that includes the calibration signal injected therein to the calibration subsystem. In such embodiments, the calibration subsystem can be configured to extract the calibration signal from received RF signal provided to the calibration subsystem by the reception probe.

In accordance with certain embodiments, the calibration signal, that is extracted from each analog transmit path of the plurality of analog transmit paths, is extracted from the analog transmit path via a coupler of the analog transmit path.

In accordance with certain embodiments, the calibration signal that is injected into each analog transmit path, of the plurality of analog transmit paths, has a bandwidth that is equal to or less than a bandwidth of the analog transmit path into which the calibration signal is injected.

In accordance with certain embodiments, the calibration signal that is injected into each analog transmit path, of the plurality of analog transmit paths, is produced using a pseudo-noise (PN) sequence.

In accordance with certain embodiments, for each analog transmit path, of the plurality of analog transmit paths, the calibration subsystem is configured to extract the calibration signal from the analog transmit path by producing a copy of a signal to be transmitted after the signal to be transmitted has been conditioned by at least a portion of the analog transmit path, correlating the copy of the signal to be transmitted with a copy of the calibration signal that was injected into the analog transmit path, and integrating results of the correlating.

In accordance with certain embodiments, each analog transmit path, of the plurality of analog transmit paths, includes at least one of the following components, each of which due to environmental variations can contribute to the gain and phase deviations to the signal to be transmitted by the analog transmit path before the signal to be transmitted is provided to an antenna element of the antenna array: a filter; an amplifier; or a frequency converter.

In accordance with certain embodiments, the gain and phase deviations caused by the analog transmit paths, which are determined by the calibration subsystem, are downlinked to a ground subsystem including one or more processors that determine adjustments to be made to gain and phase characteristics of the analog transmit paths and then uplinks the adjustments to the satellite so that the calibration subsystem can adjust the gain and phase characteristics of the analog transmit paths.

In accordance with certain embodiments, the calibration subsystem onboard the satellite determines the adjustments to be made to gain and phase characteristics of the analog transmit paths.

Certain embodiments described herein relate to methods for use with a satellite that includes analog receive paths and a signal processing equipment onboard the satellite. Each of the analog receive paths is configured to receive an RF signal via a respective antenna element of an antenna array onboard the satellite, and is configured to condition the received RF signal before providing it to the signal processing equipment. Due to environmental variations each of the analog receive paths causes respective gain and phase deviations to the RF signal received by the analog receive path before the RF signal is provided to the signal processing equipment. Such a method can include for each analog receive path, of a plurality of the analog receive paths, injecting a calibration signal into the analog receive path while the analog receive path is actively being used to receive and condition an RF signal, wherein the calibration signal is injected into the analog receive path at a power level that is below a noise floor of the analog receive path. The method can also include extracting the calibration signal from the analog receive path after the calibration signal has traveled through at least a portion of the analog receive path, and comparing the calibration signal extracted from the analog receive path to the calibration signal injected into the analog receive path to thereby determine gain and phase deviations caused by the analog receive path. The method can also include adjusting gain and phase characteristics of one or more of the plurality of analog receive paths, based on the gain and phase deviations determined for each of the plurality of the analog receive paths, to thereby compensate for different gain and phase deviations being caused by different ones of the plurality of analog receive paths.

In accordance with certain embodiments the method includes, for each analog receive path of the plurality of the analog receive paths into which the calibration signal is injected, using a coupler of the analog receive path to inject the calibration signal into the analog receive path.

In accordance with certain embodiments, the method includes, for each analog receive path of the plurality of the analog receive paths into which the calibration signal is injected, using a transmission probe onboard the satellite to simultaneously inject the calibration signal into the plurality of analog receive paths.

In accordance with certain embodiments, the method includes adjusting gain and phase characteristics of the analog receive paths by applying gain and phase coefficients to compensate for different gain and phase deviations being caused by different ones of the analog receive paths.

In accordance with certain embodiments, the method comprises, for each analog receive path, of the plurality of analog receive paths, producing a copy of a received signal after the received signal has been conditioned by at least a portion of the analog receive path, correlating the copy of the received signal with a copy of the calibration signal that was injected into the analog receive path, and integrating results of the correlating.

Certain embodiments described herein relate to methods for use with a satellite that includes signal processing equipment and analog transmit paths onboard the satellite. Each analog transmit path, of the plurality of analog transmit paths, is configured to receive an RF signal from the signal processing equipment and condition the RF signal before providing it to a respective antenna element of an antenna array onboard the satellite. Due to environmental variations, each analog transmit path, of the plurality of analog transmit paths, causes respective gain and phase deviations to the RF signal travelling through the analog transmit path before the RF signal is provided to the the respective antenna element. Such a method can include for each analog transmit path, of a plurality of the analog transmit paths, injecting a calibration signal into the analog transmit path while the analog transmit path is actively being used to condition and transmit an RF signal, wherein the calibration signal is injected into the analog transmit path at a power level that is below a noise floor of the analog transmit path. The method can also include extracting the calibration signal from the analog transmit path after the calibration signal has traveled through at least a portion of the analog transmit path, and comparing the calibration signal extracted from the analog transmit path to the calibration signal injected into the analog transmit path to thereby determine gain and phase deviations caused by the analog transmit path. The method can further include adjusting gain and phase characteristics of one or more of the plurality of analog transmit paths, based on the gain and phase deviations determined for each of the plurality of the analog transmit paths, to thereby compensate for different gain and phase deviations being caused by different ones of the plurality of analog transmit paths.

In accordance with certain embodiments, the method includes, for each analog transmit path of the plurality of the analog transmit paths into which the calibration signal is injected, using a coupler of the analog transmit path to extract the calibration signal from the analog transmit path.

In accordance with certain embodiments, the method includes, for each analog transmit path of the plurality of the analog transmit paths into which the calibration signal is injected, using a reception probe onboard the satellite to extract the calibration signal from the analog transmit path.

In accordance with certain embodiments, the method includes adjusting gain and phase characteristics of the analog transmit paths by applying gain and phase coefficients to compensate for different gain and phase deviations being caused by different ones of the analog transmit paths. The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A communication system, comprising:
    a plurality of analog receive paths and signal processing equipment onboard a satellite;
        wherein each analog receive path, of the plurality of analog receive paths, is configured to receive an RF signal via a respective antenna element of an antenna array onboard the satellite, and is configured to condition the received RF signal before providing it to the signal processing equipment downstream of the analog receive paths; and
        wherein due to environmental variations, each analog receive path, of the plurality of analog receive paths, causes respective gain and phase deviations to the RF signal received by the analog receive path before the RF signal is provided to the signal processing equipment; and
    a calibration subsystem onboard the satellite and configured to inject a calibration signal into each analog receive path, of the plurality of analog receive paths, while the analog receive path is actively being used to receive and condition an RF signal;
        wherein the calibration signal, injected into each analog receive path, of the plurality of analog receive paths, has a power level that is below a noise floor of the analog receive path into which the calibration signal is injected;
        wherein for each analog receive path, of the plurality of analog receive paths, the calibration subsystem is also configured to extract the calibration signal and compare the extracted calibration signal to the injected calibration signal to thereby determine the respective gain and phase deviations caused by the analog receive path; and
        wherein the calibration subsystem is also configured to adjust gain and phase characteristics of one or more of the analog receive paths based on the gain and phase deviations determined for each of the plurality of analog receive paths to thereby compensate for different gain and phase deviations being caused by different ones of the analog receive paths.

2. The system of claim 1, wherein the calibration signal, that is injected into each analog receive path of the plurality of analog receive paths, is injected into the analog receive path via a coupler of the analog receive path.

3. The system of claim 1, further comprising:
    a transmission probe onboard the satellite;
    wherein the calibration subsystem causes the calibration signal to be emitted by the transmission probe to thereby cause the calibration signal to be simultaneously injected into the plurality of analog receive paths.

4. The system of claim 1, wherein the calibration subsystem is configured to adjust gain and phase characteristics of the analog receive paths by applying gain and phase coefficients to compensate for different gain and phase deviations being caused by different ones of the analog receive paths.

5. The system of claim 1, wherein the calibration signal that is injected into each analog receive path, of the plurality of analog receive paths, has a bandwidth that is equal to or less than a bandwidth of the analog receive path into which the calibration signal is injected.

6. The system of claim 1, wherein the calibration signal that is injected into each analog receive path, of the plurality of analog receive paths, is produced using a pseudo-noise (PN) sequence.

7. The system of claim 1, wherein for each analog receive path, of the plurality of analog receive paths, the calibration subsystem is configured to extract the calibration signal from the analog receive path by:
    producing a copy of a received signal after the received signal has been conditioned by the analog receive path;
    correlating the copy of the received signal with a copy of the calibration signal that was injected into the analog receive path; and
    integrating results of the correlating.

8. The system of claim 1, wherein each analog receive path, of the plurality of analog receive paths, includes at least one of the following components, each of which due to environmental variations can contribute to the gain and phase deviations to the RF signal received by the analog receive path before the RF signal is provided to a beamformer: a filter; an amplifier; or a frequency converter.

9. The system of claim 1, wherein the gain and phase deviations caused by the analog receive paths, which are determined by the calibration subsystem, are downlinked to a ground subsystem including one or more processors that determine adjustments to be made to gain and phase characteristics of the analog receive paths and then uplinks the adjustments to the satellite so that the calibration subsystem can adjust the gain and phase characteristics of the analog receive paths.

10. The system of claim 1, wherein the calibration subsystem onboard the satellite determines adjustments to be made to gain and phase characteristics of the analog receive paths.

11. A communication system, comprising:
  signal processing equipment and a plurality of analog transmit paths onboard a satellite;
    wherein each analog transmit path, of the plurality of analog transmit paths, is configured to receive an RF signal from the signal processing equipment and condition the RF signal before providing it to a respective antenna element of an antenna array onboard the satellite; and
    wherein due to environmental variations, each analog transmit path, of the plurality of analog transmit paths, causes respective gain and phase deviations to the RF signal travelling through the analog transmit path before the RF signal is provided to the respective antenna element; and
  a calibration subsystem onboard the satellite and configured to inject a calibration signal into each analog transmit path, of the plurality of analog transmit paths, while the analog transmit path is actively being used to condition and transmit an RF signal;
    wherein the calibration signal, injected into each analog transmit path, of the plurality of analog transmit paths, has a power level that is below a noise floor of the analog transmit path into which the calibration signal is injected;
    wherein for each analog transmit path, of the plurality of analog transmit paths, the calibration subsystem is also configured to extract the calibration signal and compare the extracted calibration signal to the injected calibration signal to thereby determine the respective gain and phase deviations caused by the analog transmit path; and
    wherein the calibration subsystem is also configured to adjust gain and phase characteristics of one or more of the analog transmit paths based on the gain and phase deviations determined for each of the plurality of analog transmit paths to thereby compensate for different gain and phase deviations being caused by different ones of the analog transmit paths.

12. The system of claim 11, wherein the calibration signal, that is injected into each analog transmit path of the plurality of analog transmit paths, is injected into the analog transmit path via a coupler of the analog transmit path.

13. The system of claim 11, further comprising:
  a reception probe onboard the satellite;
  wherein the reception probe is configured to receive RF signals, transmitted by the antenna elements of the antenna array, and configured to provide a received RF signal that includes the calibration signal injected therein to the calibration subsystem; and
  wherein the calibration subsystem is configured to extract the calibration signal from received RF signal provided to the calibration subsystem by the reception probe.

14. The system of claim 11, wherein the calibration signal, that is extracted from each analog transmit path of the plurality of analog transmit paths, is extracted from the analog transmit path via a coupler of the analog transmit path.

15. The system of claim 11, wherein the calibration signal that is injected into each analog transmit path, of the plurality of analog transmit paths, has a bandwidth that is equal to or less than a bandwidth of the analog transmit path into which the calibration signal is injected.

16. The system of claim 11, wherein the calibration signal that is injected into each analog transmit path, of the plurality of analog transmit paths, is produced using a pseudo-noise (PN) sequence.

17. The system of claim 11, wherein for each analog transmit path, of the plurality of analog transmit paths, the calibration subsystem is configured to extract the calibration signal from the analog transmit path by:
  producing a copy of a signal to be transmitted after the signal to be transmitted has been conditioned by at least a portion of the analog transmit path;
  correlating the copy of the signal to be transmitted with a copy of the calibration signal that was injected into the analog transmit path; and
  integrating results of the correlating.

18. The system of claim 11, wherein each analog transmit path, of the plurality of analog transmit paths, includes at least one of the following components, each of which due to environmental variations can contribute to the gain and phase deviations to the signal to be transmitted by the analog transmit path before the signal to be transmitted is provided to an antenna element of the antenna array: a filter; an amplifier; or a frequency converter.

19. The system of claim 11, wherein the gain and phase deviations caused by the analog transmit paths, which are determined by the calibration subsystem, are downlinked to a ground subsystem including one or more processors that determine adjustments to be made to gain and phase characteristics of the analog transmit paths and then uplinks the adjustments to the satellite so that the calibration subsystem can adjust the gain and phase characteristics of the analog transmit paths.

20. The system of claim 11, wherein the calibration subsystem onboard the satellite determines adjustments to be made to gain and phase characteristics of the analog transmit paths.

21. A method for use with a satellite that includes analog receive paths and signal processing equipment onboard the satellite,
  wherein each of the analog receive paths is configured to receive an RF signal via a respective antenna element of an antenna array onboard the satellite, and is configured to condition the received RF signal before providing it to the signal processing equipment; and
  wherein due to environmental variations each of the analog receive paths causes respective gain and phase deviations to the RF signal received by the analog receive path before the RF signal is provided to the signal processing equipment;
the method comprising:
(a) for each analog receive path, of a plurality of the analog receive paths,
  (a.1) injecting a calibration signal into the analog receive path while the analog receive path is actively being used to receive and condition an RF signal, wherein the calibration signal is injected into the analog receive path at a power level that is below a noise floor of the analog receive path;
  (a.2) extracting the calibration signal from the analog receive path after the calibration signal has traveled through at least a portion of the analog receive path; and
  (a.3) comparing the calibration signal extracted from the analog receive path to the calibration signal injected into the analog receive path to thereby determine gain and phase deviations caused by the analog receive path; and (b) adjusting gain and phase characteristics of one or more of the plurality of analog receive paths, based on the gain and phase deviations determined for each of the plurality of the analog receive paths, to thereby compensate for different gain and phase deviations being caused by different ones of the plurality of analog receive paths.

22. The method of claim 21, wherein step (a.1) includes, for each analog receive path of the plurality of the analog receive paths into which the calibration signal is injected, using a coupler of the analog receive path to inject the calibration signal into the analog receive path.

23. The method of claim 21, wherein step (a.1) includes, for each analog receive path of the plurality of the analog receive paths into which the calibration signal is injected, using a transmission probe onboard the satellite to simultaneously inject the calibration signal into the plurality of analog receive paths.

24. The method of claim 21, wherein step (b) includes adjusting gain and phase characteristics of the analog receive paths by applying gain and phase coefficients to compensate for different gain and phase deviations being caused by different ones of the analog receive paths.

25. The method of claim 21, wherein step (a.2) comprises, for each analog receive path, of the plurality of analog receive paths:
- producing a copy of a received signal after the received signal has been conditioned by at least a portion of the analog receive path;
- correlating the copy of the received signal with a copy of the calibration signal that was injected into the analog receive path; and
- integrating results of the correlating.

26. A method for use with a satellite that includes signal processing equipment and analog transmit paths onboard the satellite,
- wherein each analog transmit path, of the plurality of analog transmit paths, is configured to receive an RF signal from the signal processing equipment and condition the RF signal before providing it to a respective antenna element of an antenna array onboard the satellite; and
- wherein due to environmental variations, each analog transmit path, of the plurality of analog transmit paths, causes respective gain and phase deviations to the RF signal travelling through the analog transmit path before the RF signal is provided to the respective antenna element;

the method comprising:
(a) for each analog transmit path, of a plurality of the analog transmit paths,
- (a.1) injecting a calibration signal into the analog transmit path while the analog transmit path is actively being used to condition and transmit an RF signal, wherein the calibration signal is injected into the analog transmit path at a power level that is below a noise floor of the analog transmit path;
- (a.2) extracting the calibration signal from the analog transmit path after the calibration signal has traveled through at least a portion of the analog transmit path; and
- (a.3) comparing the calibration signal extracted from the analog transmit path to the calibration signal injected into the analog transmit path to thereby determine gain and phase deviations caused by the analog transmit path; and (b) adjusting gain and phase characteristics of one or more of the plurality of analog transmit paths, based on the gain and phase deviations determined for each of the plurality of the analog transmit paths, to thereby compensate for different gain and phase deviations being caused by different ones of the plurality of analog transmit paths.

27. The method of claim 26, wherein step (a.2) includes, for each analog transmit path of the plurality of the analog transmit paths into which the calibration signal is injected, using a coupler of the analog transmit path to extract the calibration signal from the analog transmit path.

28. The method of claim 26, wherein step (a.2) includes, for each analog transmit path of the plurality of the analog transmit paths into which the calibration signal is injected, using a reception probe onboard the satellite to extract the calibration signal from the analog transmit path.

29. The method of claim 26, wherein step (b) includes adjusting gain and phase characteristics of the analog transmit paths by applying gain and phase coefficients to compensate for different gain and phase deviations being caused by different ones of the analog transmit paths.

* * * * *

UNITED STATES PATENT AND TRADEMARK OFFICE
CERTIFICATE OF CORRECTION

PATENT NO. : 10,284,308 B1
APPLICATION NO. : 15/926628
DATED : May 7, 2019
INVENTOR(S) : Elwailly et al.

It is certified that error appears in the above-identified patent and that said Letters Patent is hereby corrected as shown below:

In the Claims

Column 27, Line 56 (Claim 13): After "from" and before "received" insert -- the --

Signed and Sealed this
Fourteenth Day of April, 2020

Andrei Iancu
*Director of the United States Patent and Trademark Office*